United States Patent [19] [11] 3,907,621

Polichette et al. [45]*Sept. 23, 1975

[54] METHOD OF SENSITIZING SUBSTRATES FOR CHEMICAL METALLIZATION

[75] Inventors: Joseph Polichette, South Farmingdale; Edward J. Leech, Oyster Bay; Francis J. Nuzzi, Lynbrook, all of N.Y.

[73] Assignee: Photocircuits, Hartford, Conn.

[ * ] Notice: The portion of the term of this patent subsequent to Nov. 13, 1990, has been disclaimed.

[22] Filed: Feb. 18, 1972

[21] Appl. No.: 227,446

Related U.S. Application Data

[63] Continuation-in-part of Ser. No. 167,432, Oct. 29, 1971, Pat. No. 3,772,056.

[52] U.S. Cl. .................... 156/18; 96/36.2; 117/5.5; 117/47 R; 117/47 A; 117/93.3; 117/212; 117/217; 117/218; 117/130 E

[51] Int. Cl. .......................... C23c 3/02; C23f 1/00

[58] Field of Search..... 117/212, 93.3, 47 A, 130 E, 117/5.5, 217, 218; 96/36.2; 156/8, 18, 13, 7

[56] References Cited

UNITED STATES PATENTS

| | | | |
|---|---|---|---|
| 3,436,233 | 4/1969 | Jackson | 117/130 E |
| 3,562,005 | 2/1971 | De Angelo et al. | 117/130 E |
| 3,615,732 | 10/1971 | Shipley et al. | 117/130 E |
| 3,627,558 | 12/1971 | Roger et al. | 117/47 |
| 3,674,485 | 7/1972 | Jonker et al. | 96/36.2 |
| 3,704,208 | 11/1972 | Russo | 117/47 |

*Primary Examiner*—Charles E. Van Horn
*Assistant Examiner*—Jerome W. Massie
*Attorney, Agent, or Firm*—Morgan, Finnegan, Pine, Foley & Lee

[57] ABSTRACT

There is provided a new process for the production of printed circuits. The process comprises coating a base with a layer of copper, nickel, cobalt or iron salts or salt compositions, which on exposure to radiant energy, such as heat, light, etc., thermal or chemical reducing agents are converted to a layer of metal nuclei that is non-conductive, but which is capable of catalyzing the deposition of metal onto the base from an electroless metal deposition solution in contact with the metal nuclei.

32 Claims, 21 Drawing Figures

METHOD OF SENSITIZING SUBSTRATES FOR CHEMICAL METALLIZATION

This application is a continuation-in-part of Ser. No. 167,432, filed July 29, 1971 now U.S. Pat. No. 3772056.

This invention relates to novel and improved methods for metallizing bodies, e.g., insulating supports, and to the products which result from such methods.

More particularly, the present invention relates to imposing, by thermal, radiant energy or chemical reduction methods, sensitive non-conductive metallic areas on the surfaces of such bodies which catalyze the deposition of strongly adherent and rugged deposits of electroless metal.

Although applicable whenever it is desired to apply a metallic coating to a base, as for example, for decorative or protective effects, or to make electrical conductors of a wide variety of shapes and configurations, the procedures for metallization herein are particularly useful for making printed circuits from readily available base materials, e.g., metal clad laminates, resinous insulating laminated bases or porous non-conductive materials, e.g., fiberglass, paper, cloth, cardboard, ceramics and the like.

It is a primary object of this invention to provide bases sensitive to metallization by electroless plating and, optionally, subsequent electroplated metal deposition.

Another principal object of this invention is to provide improvements in metallization processes in which a base is sensitized to metallization by electroless plating.

An additional object of this invention is to provide base materials and processes for electroless metallization in which there are employed non-noble metal sensitizers which are much more economical in cost, but equivalent in performance to the noble metal-containing sensitizers used until now.

Another object of this invention is to provide adherent electroless metal coatings directly bonded to base materials either directly or through an intermediate, adhesive layer.

Although the invention will be described with particular reference to printed circuits, and although fabrication of printed circuits constitutes a primary and preferred application, it should be understood that the invention is not limited to printed circuits but is applicable to metallizing surfaces broadly.

Heretofore, it has been known to employ a number of pretreatment or sensitization baths in effecting the electroless deposition of metals on various surfaces. All such prior art sensitization baths used commercially have been expensive because they depend upon a noble metal, e.g., palladium, platinum, gold, silver, etc., as the sensitizing component. In spite of the expense, however, the prior art has stood fast in its feeling that precious metals must be used if sensitization to electroless metal deposition and good bond strength between the sensitized surface and the electroless metal deposit is to be achieved. In one embodiment, such prior art noble metal sensitization baths are used sequentially by providing first a film of a Group IV metal ion, e.g., stannous ion, and then a film of reduced precious metal, e.g., reduced palladium, on the surface. In another embodiment, unitary noble metal baths are used, from which there is deposited on the surface a film of colloidal noble metal or a complex of noble metal which is later reduced.

It has now been discovered that adherent electroless metal deposits can be applied to a broad variety of insulating substrates without the need to use expensive noble metals.

In addition, the methods of this invention avoid the flash deposition of precious metals which sometimes causes loss of bond strengths between the electroless metal and the base in prior art procedures.

When following the teachings herein, there can be obtained printed circuits of the highest quality using base metals only in all steps of their production.

DESCRIPTION OF DRAWINGS

Other objects of the invention will become apparent after a reading of the following specification and inspection of the accompanying drawings wherein.

They are not drawn to scale.

Figure 19:
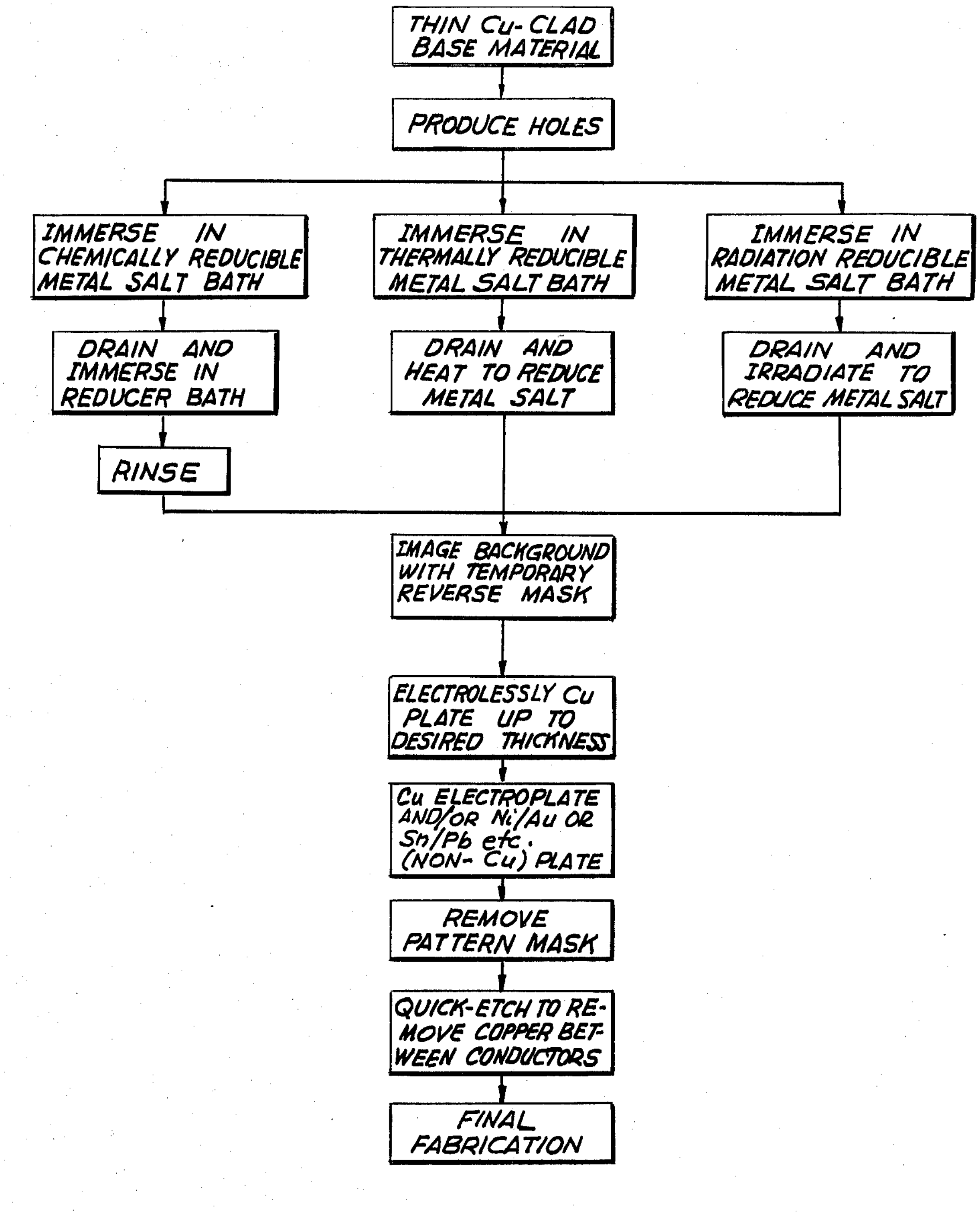

FIG. 19 is a flow diagram showing the steps employed in making a printed circuit with plated through holes when a thin copper clad base material is used.

Figure 20:
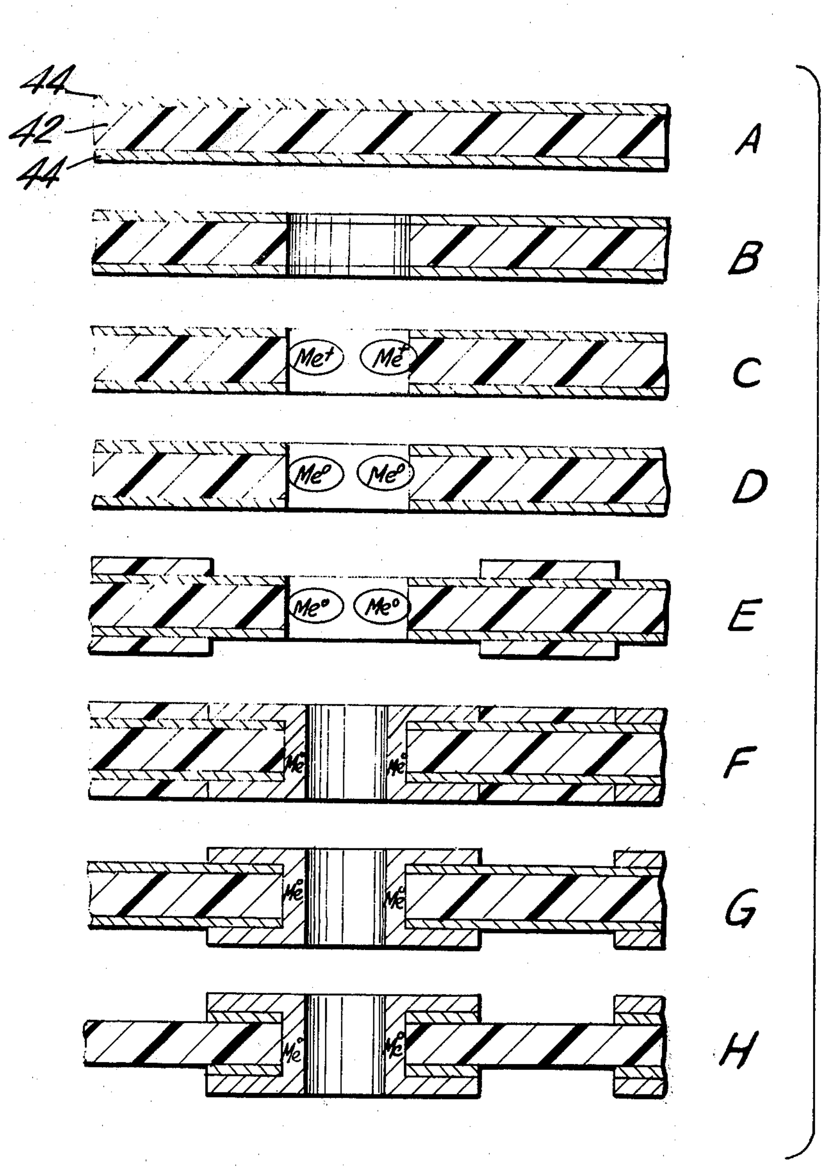

FIG. 20 is a schematic illustration showing a sequence of steps that may be used in making two-sided printed circuit boards from thin metal clad base materials. It is not drawn to scale.

DESCRIPTION OF THE INVENTION

According to the present invention there are provided new articles of manufacture comprising a base and a layer on the base, the layer comprising a metal salt or metal salt composition which on exposure to radiant energy, such as heat, light, electron beams, X-rays, etc., thermal energy such as direct contact with a heated object or to a chemical reducing agent is converted to a layer of metal nuclei which is non-conductive and which is capable of catalyzing the deposition of electroless metal from an electroless metal deposition solution in contact with the base, the metal salt being selected from salts of copper, nickel, cobalt, iron or mixtures of any of the foregoing.

According to the present invention there is also provided in a process for producing metallized articles by contacting a base sensitized to the reception of electroless metal with an electroless metal deposition solution, an improvement which comprises providing the base with a layer of a metal salt or metal salt composition which on exposure to radiant energy, such as heat, light, electron beams, X-rays, etc., thermal energy such as direct contact with a heated object or to a chemical reducing agent is convertible to a non-conductive layer of metallic nuclei and exposing the layer to a suitable source of radiant energy or to a chemical reducing agent, so as to convert it to a non-conducting layer of metal nuclei which are catalytic to the reception of electroless metal, said metal salt being selected from salts of copper, nickel, cobalt, iron or mixtures of any of the foregoing.

In carrying out the present invention, the base is cleaned, if necessary, then coated with the metal salt, e.g., by dip-coating in a solution of the salt, on areas on which it is desired to deposit metal electrolessly. When it is desired to metallize only selected areas of the surface of a body and/or only selected interior portions thereof, e.g., hole walls, suitable masking may be used to protect the areas which are to be free of the metal deposit during as well as after the coating and reduction.

Among the materials which may be used as bases in this invention are inorganic and organic substances, such as glass, ceramics, porcelain, resins, paper, cloth, and the like. Metalclad or unclad substances of the type described may be used.

For printed circuits, among the materials which may be used as the bases, may be mentioned metal clad or unclad insulating thermosetting resins, thermoplastic resins and mixtures of the foregoing, including fiber, e.g., fiberglass, impregnated embodiments of the foregoing.

Included in the thermoplastic resins are acetal resins; acrylics, such as methyl acrylate, cellulosic resins, such as ethyl cellulose, cellulose acetate, cellulose propionate, cellulose acetate butyrate, cellulose nitrate, and the like; polyethers, e.g. polyphenylene ether; nylon; polyethylene; polystyrene; styrene blends, such as acrylonitrile styrene and copolymers and acrylonitrile-butadiene styrene copolymers; polycarbonates; polychlorotrifluoroethylene; and vinyl polymers and copolymers, such as vinyl acetate, vinyl alcohol, vinyl butyral, vinyl chloride, vinyl chloride-acetate copolymer, vinylidene chloride and vinyl formal.

Among the thermosetting resins may be mentioned allyl phthalate; furane, melamine-formaldehyde; phenol formaldehyde and phenolfurfural copolymers, alone or compounded with butadiene acrylonitrile copolymers or acrylonitrile-butadiene-styrene copolymers; polyacrylic esters; silicones; urea formaldehydes; epoxy resins; allyl resins, glyceryl phthalates; polyesters; and the like.

Porous materials, comprising paper, wood, Fiberglas, cloth and fibers, such as natural and synthetic fibers, e.g., cotton fibers, polyester fibers, and the like, as well as such materials themselves, may also be metallized in accordance with the teachings herein. The invention is particularly applicable to the metallization of resin impregnated fibrous structures and varnish coated resin impregnated fiber structures of the type described.

The bases coated with catalytic metal nuclei generically will include any insulating material so-coated regardless of shape or thickness, and includes thin films and strips as well as thick substrata. An adhesive layer can be on the base, beneath the metal nuclei.

The bases referred to herein are inorganic or organic materials of the type described which have surface layer comprising metallic nuclei which are catalytic to the reception of electroless metal, "catalytic" in this sense referring to an agent which is capable of reducing the metal ions in an electroless metal deposition solution to metal.

The catalytic metals for use herein are selected from non-noble metal of Period 4 of Groups VIII and IB of the Period Table of the Elements; iron, cobalt, nickel and copper. Particularly preferred is copper.

The catalytic metal, for example in the form of a solution of the reducible salt or reducible salt composition is applied to the base and then reduced on the surface of the base by application of radiant energy, e.g., heat, light, such as ultra-violet light, electron beams, X-ray and the like, thermal energy such as direct contact with a heated object or by treatment with a chemical reducing agent. If multivalent, the reducible salt can be in any oxidation state, e.g., both, cuprous and cupric, ferrous and ferric ions may be used.

In one manner of proceeding, a solution of a heat-reducible metal salt, e.g., cupric formate, and optionally a developer, e.g., glycerine, and a surfactant, in a solvent, such as water, is dip-coated onto the base, dried and heated, e.g., at 100° to 170°C., preferably at 130° to 140°C., until the coating has darkened in color, indicating the metallic salt has been reduced to a non-conductive layer of copper nuclei. The base is now catalytic to the deposition of electroless metal on the surface of the base and on the walls in any holes in the base.

In more detail, according to such a heat-activation process, the base, if necessary, is cleaned and pretreated by one of the methods to be described. The clean base is dip coated in one of the metal salt solutions, to be described in detail hereinafter, for a short time, e.g., 1–3 minutes. The coated base is then placed in a heated area, e.g., an oven for 10 to 20 minutes, or until the metal salt is reduced to metallic nuclei. The temperature of heating can range from 100° to 170°C., but the preferred range is 130°–140°C. The reduction is considered complete when the coating has darkened in color. The base is then removed from the heated area and allowed to cool. The coating is now catalytic to electroless metal deposition and can be processed in known ways, as will be described hereinafter, for the subsequent build-up of electroless metal plating and, optionally, a top layer of electroplating.

As an alternative to the dip coating procedure, the solution may be coated with a solution of a thermally, radiantly or chemically reducible metal by means of a pre-cut impression forming means which may be a rubber stamp. The stamp is moistened with an appropriate solution and then applied to the insulated board to form the pre-selected circuit configuration. Hand or mechanically operated scribing means may also be used for the purpose. For example felt tipped pens may be used with or without stencils for particular applications.

The insulated base may be selectively masked either before or after the dip coating with the reducible salt solution. This is described in the drawings and below in the specification.

Another method which employs thermal energy as a reducing means, comprises dip-coating onto the base a solution of heat reducible metal salt, e.g., cupric formate and, optionally a developer, e.g., glycerine, and a surfactant, in a solvent such as water. The base is dried and is contacted directly with a heated object in those areas which are to be rendered catalytic to electroless metal by the reduction of the metal salt to catalytic nuclei. The heated object may be a metal surface which conforms exactly to the surface of the base which is to be metallized or substantially to the surface of the walls of the holes in said base. If a printed circuit is to be formed, a performed die in the configuration of the circuit may be heated to a temperature of 100°–170°C and applied to the base surface. When removed a circuit pattern of catalytic nuclei will remain which may then be metallized to form a conductive circuit pattern. A heated scribe may also be used to thermally reduce the metal salt. To prevent sticking, the heated object may be coated with an anti-sticking agent such as polytetrafluoroethylene.

The terms "thermally reducible salts" and "radiation reducible salts" will include some, if not many, of the same materials, and their use herein refers primarily to the intended means by which they are to be reduced in the practice of the invention. The term "reduction means" is used to include the described chemical baths, radiation techniques and the direct contact of a prepared surface with a heated object.

In another manner of proceeding, a solution of a metal salt composition, e.g., cupric formate, and a light-sensitive reducing agent, a second reducing agent, and optionally (for hard to wet surfaces) a surfactant, in water or an organic solvent, such as an alcohol, dimethyl formamide, dimethyl sulfoxide, and the like, is coated on the base, dried and exposed to ultraviolet light radiation to form a non-conductive layer of metallic nuclei. Suitable light-sensitive reducing agents are aromatic diazo compounds, ferric salts, e.g., ferric oxalate, ferric ammonium sulfate, dichromates, e.g., ammonium dichromate, anthraquinone disulfonic acids or salts thereof, glycine (especially active under humid surface conditions), L-ascorbic acid, azide compounds, and the like, as well as tin compounds, e.g., stannous chloride, silver compounds, palladium compounds, gold compounds, mercury compounds, cobaltous chloride, nickelous chloride, zinc chloride, and the like, the latter group usually being added in trace amounts to enhance image formation. Among the second reducers are polyhydroxy alcohols, such as glycerol, ethylene glycol, pentaerythritol, mesoerythritol, 1,3-propanediol, sorbitol, mannitol, propylene glycol, 1,2-butane-diol, pinacol, sucrose, dextrin, and compounds such as triethanolamine, propylene oxide, polyethylene glycols, lactose, starch, ethylene oxide and gelatin. Compounds which are also useful as secondary reducers are aldehydes, such as formaldehyde, benzaldehyde, acetaldehyde, n-butyraldehyde, polyamides, such as nylon, albumin and gelatin; leuco bases of triphenyl methane dyes, such as 4-dimethylamino triphenylmethane, 4,4',4''-tris-dimethylaminotriphenylmethane; leuco bases of xanthene dyes, such as 3,6-bis dimethylamino xanthene and 3,6-bis dimethylamino-9-(2-carboxyethyl)xanthene; polyethers, such as ethylene glycol diethyl ether, diethylene glycol diethyl ether, tetraethylene glycol dimethyl ether, and the like. Among the suitable surfactants are polyethenoxy nonionic ethers, such as Triton X-100, manufactured by Rohm & Haas Co., and nonionic surfactants based on the reaction between nonyl phenyl and glycidol, such as Surfactants 6G and 10G manufactured by Olin Mathieson Company.

After exposure to ultraviolet light radiation for a few minutes the reduction to metallic nuclei is generally complete. If desired, the reduction can be further enhanced by heating at temperatures of up to about 130° to 140°C. for 3 to 5 minutes more. The base is now catalytic to the deposition of electroless metal on the surface of the base and on the walls in any holes in the base in which the reduced metal nuclei are arranged.

In still another manner of proceeding, a reducible metal salt composition, e.g., cupric formate, cupric gluconate, cupric acetate, cupric chloride, nickelous chloride, cobaltous chloride or ferrous sulfate in aqueous or non-aqueous solution, e.g., water, dimethyl formamide, ethyl acetate, trichloroethane, n-butanol, methanol, and the like, containing a surface active agent and containing an auxiliary reducing agent such as glycerine, is dip-coated onto the base, dried and exposed to a chemical reducing agent, e.g., an alkali metal borohydride, e.g., sodium or potassium borohydride, an alkali metal hydrosulfite, e.g., sodium hydrosulfite, or an amine borane, e.g., dimethylamine borane or morpholine borane in an aqueous or non-aqueous solvent, e.g., water or methanol, for about 1 to 2 minutes or until the formation of reduced metallic nuclei is complete. After the base is rinsed free of chemical reagents, e.g., with water, the base is catalytic to the deposition of electroless metal on the surface of the base and on the walls in any holes in the base in which the reduced metal nuclei are arranged.

In more detail, in such a chemical reduction process, the base, if necessary will be cleaned and roughened by methods to be described later. The base is then dip-coated into one of the metal salt solutions, to be described, for a short time, e.g., 1–5 minutes and allowed to dry. The drying rate is not critical but it is dependent on the method of drying and the temperature used. Temperatures about 170°C. are not preferred, however. In non-aqueous systems, the drying rate can be regulated by the type of solvent system used. For example, 1,1,1-trichloroethane and ethyl acetate dry rapidly in air and thus require little or no heat for quick and complete drying.

The base having a layer of the dry metal salt thereon is next immersed into a chemical reducing solution, of the type to be described, for about 1–2 minutes or until the base is substantially darkened in color. This indicates that the metal salt has been reduced to free metal nuclei, e.g., copper. These portions of the substrate are now catalytic to the deposition of electroless metal.

The base is then rinsed in running water for a short time, e.g., 3–5 minutes. Finally, the base is immersed into an electroless metal bath for the deposition of metal and, if desired, a galvanic metal deposit is finally put down as a top layer.

Typically, the autocatalytic or electroless metal deposition solutions for use in depositing electroless metal on the bodies having a layer of catalytic metal nuclei prepared as described herein comprise an aqueous solution of a water soluble salt of the metal or metals to be deposited, a reducing agent for the metal cations, and a complexing or sequestering agent for the metal cations. The function of the complexing or sequestering agent is to form a water soluble complex with the dissolved metallic cations so as to maintain the metal in solution. The function of the reducing agent is to reduce the metal cation to metal at the appropriate time.

Typical of such solutions are electroless copper, nickel, cobalt, silver, gold, tin, rhodium and zinc solutions. Such solutions are well known in the art and are capable of autocatalytically depositing the identified metals without the use of electricity.

Typical of the electroless copper solutions which may be used are those described in U.S. Pat. No. 3,095,309, the description of which is incorporated herein by reference. Conventionally, such solutions comprise a source of cupric ions, e.g., copper sulfate, a reducing agent for cupric ions, e.g., formaldehyde, a complexing agent for cupric ions, e.g., tetrasodium ethylenediamine-tetraacetic acid, and a pH adjustor, e.g., sodium hydroxide.

Typical electroless nickel baths which may be used are described in Brenner, *Metal Finishing*, November 1954, pages 68 to 76, incorporated herein by reference. They comprise aqueous solutions of a nickel salt, such as nickel chloride, an active chemical reducing agent for the nickel salt, such as the hypophosphite ion, and a complexing agent, such as carboxylic acids and salts thereof.

Electroless gold plating baths which may be used are disclosed in U.S. Pat. No. 2,976,181, hereby incorporated herein by reference. They contain a slightly water soluble gold salt, such as gold cyanide, a reducing agent for the gold salt, such as the hypophosphite ion, and a chelating or complexing agent, such as sodium or potassium cyanide. The hypophosphite ion may be introduced in the form of the acid or salts thereof, such as the sodium, calcium and the ammonium salts. The purpose of the complexing agent is to maintain a relatively small portion of the gold in solution as a water soluble gold complex, permitting a relatively large portion of the gold to remain out of solution as gold reserve. The pH of the both will be about 13.5 or between about 13 and 14, and the ion ratio of hypophosphite radical to insoluble gold salt may be between about 0.33 and 10:1.

Typical electroless cobalt and electroless silver baths will be described in the Examples. Electroless tin, rhodium and zinc baths are known by those skilled in the art.

A specific example of an electroless copper deposition bath suitable for use will now be described:

| | Moles/liter |
|---|---|
| Copper sulfate | 0.03 |
| Sodium hydroxide | 0.125 |
| Sodium cyanide | 0.0004 |
| Formaldehyde | 0.08 |
| Tetrasodium ethylenediaminetetraacetate | 0.036 |
| Water | Remainder |

This bath is preferably operated at a temperature of about 55°C. and will deposit a coating of ductile electroless copper about 1 mil thick in about 51 hours.

Utilizing the electroless metal baths of the type described, very thin conducting metal films or layers will be laid down on the catalytic metal nuclei. Ordinarily, the metal films superimposed on the catalytic metal nuclei by electroless metal deposition will range from 0.1 to 7 mils in thickness, with metal films having a thickness of even less than 0.1 mil being a distinct possibility.

Among its embodiments, the present invention contemplates metallized substrates in which the electroless metal, e.g., copper, nickel, gold or the like, has been further built up by attaching an electrode to the electroless metal surface and electrolytically, i.e., galvanically depositing on it more of the same or different metal, e.g., copper, nickel, silver, gold, rhodium, tin, alloys thereof, and the like. Electroplating procedures are conventional and well known to those skilled in the art.

For example, a pyrophosphate copper bath is commercially available for operation at a pH of 8.1 to 8.4, a temperature of 50°C., and a current density of 50 amp./sq.ft. In addition, a suitable fluoborate copper bath is operated at a pH of 0.6 to 1.2, a temperature of 25°–50°C., and a current density of 25 to 70 amp. per sq.ft. and is comprised of:

| | |
|---|---|
| copper fluoborate $Cu(BF_4)_2$ | 225 –450 g./l. |
| fluoboric acid, $HBF_4$ | 2 – 15 g./l. |
| boric acid, $H_3BO_3$ | 12 – 15 g./l. |

For printed circuit application, copper deposits for use as the basic conductor material are usually 0.001 to 0.003 in. thick.

Silver may be deposited galvanically from a cyanide bath operated at a pH of 11.5 to 12, a temperature of 25°–35°C., and a current density of 5–15 amp./sq.ft. An illustrative galvanic silver bath is comprised of:

| | |
|---|---|
| silver cyanide, AgCN | 50 g./l. |
| potassium cyanide, KCN | 110 g./l. |
| potassium carbonate, $K_2CO_3$ | 45 g./l. |
| brighteners | Variable |

Gold may be deposited galvanically from an acid gold citrate bath at pH 5–7, a temperature of 45°–60°C., and a current density of 5–15 amp./sq.ft. An illustrative galvanic gold bath consists of:

| | |
|---|---|
| Sodium gold cyanide, $NaAu(CN)_2$ | 20 – 30 g./l. |
| dibasic ammonium citrate $(NH_4)_2C_6H_5O_7$ | 25 –100 g./l. |

Nickel can be galvanically deposited at pH 4.5 to 5.5, a temperature of 45°C., and a current density of 20 to 65 amp./ sq.ft., the bath containing:

| | |
|---|---|
| nickel sulfate, $NiSO_4.6H_2O$ | 240 g./l. |
| nickel chloride, $NiCl_2.6H_2O$ | 45 g./l. |
| boric acid, $H_3BO_3$ | 30 g./l. |

Tin and rhodium and alloys can be galvanically deposited by procedures described in Schlabach et al., Printed and Integrated Circuitry, McGraw-Hill, New York, 1963, p. 146–148.

It is essential in carrying out the process of this invention to use a clean base — otherwise adhesion, as measured by the work needed to peel the electroless metal from the base, will be non-existent. Ordinarily, this will require chemical cleaning and/or preactivation and activation of the surface of the base with adsorbent substrates, e.g., glass cloth, fabrics, paper and the like, no special pretreatment is required, but the surface must be clean.

If the base is a metal clad laminate, e.g., having holes drilled through or punched therein, conventional cleaning methods are used to remove all contaminants and loose particles. The surface should be "chemically clean", i.e., freee of grease, and surface films. A simple test is to spray the surface with distilled water. If the surface is chemically clean, the water will form a smooth film. If not, the water will break into droplets.

A base can be made clean by scrubbing with pumice or the like to remove heavy soils; rinsing with water; and subsequently removing soiling due to organic substances with a suitable alkaline cleaning composition, e.g.:

| | |
|---|---|
| sodium isopropyl naphthalene sulfonate | 3 g./l. |
| sodium sulfate | 1 g./l. |
| sodium tripolyphosphate | 14 g./l. |
| sodium metasilicate | 5 g./l. |
| tetrasodium pyrophosphate | 27 g./l. |

This operation is desirably performed at 160°–180°F. The surfaces are exposed to the bath for 5 to 30 minutes. Other suitable alkali cleaning compositions, detergents and soaps may be used, taking care in the selection not to have the surface attacked by the cleaner. If present, surface oxides can be removed from metal surfaces with light etchants, such as 25 percent ammonium persulfate in water, or the cupric chloride etchant of U.S. Pat. No. 2,908,557. On the other hand, if the shape of the base permits, a sanding operation with fine abrasive can also be used to remove oxides.

Unclad resinous substrates, e.g. resinous, e.g. epoxy resins, impregnated fibrous structures and varnish, e.g. epoxy resin varnish, coated resin impregnated fiber structures are best provided with an additional surface treatment. e.g., the direct bonding pretreatment process of copending U.S. Ser. No. 72,582, filed Sept. 16, 1970, and 111,577, filed Feb. 1, 1971 both now abandoned and the application filed concurrently herewith in the name of E. J. Leech et al Ser. No. 227,678, filed Feb. 18, 1972, now abandoned, SENSITIZED SUBSTRATES FOR CHEMICAL METALLIZATION incorporated by reference to achieve strong adhesion of electroless metal deposits to the base. The procedure comprises activating the surface to render it temporarily polar and wettable and then permanently polarizing the surface with an oxidizing agent. Thereafter, residual oxidizing agent on the surface is reduced with a reducing agent.

This may comprise treating the base with a suitable organic or inorganic acid, e.g. chromic or sulfuric acid, or base solution to render it porous. In many cases, it is desirable to also treat the surface with a solvent. e.g., dimethyl formamide or dimethyl sulfoxide before the etching process. The effect of such treatment is to render the surface permanently polar. A reduction step is thereafter employed.

Depending upon the particular insulating bases involved, other ion exchange imparting materials may be utilized to effect the aforementioned polarization procedure. For example, acidified sodium fluoride, hydrochloric and hydrofluoric acids, chromic acid, borates, fluoroborates and caustic soda, as well as mixtures thereof, have been found effective to polarize the various synthetic plastic resin insulating base materials described herein.

Adhesive films which have dispersed catalytic particles may also be used in conjunction with the process of this invention. These films are described in U.S. Pat. No. 3,625,758 and U.S. Pat. No. 3,779,758 both of which are hereby incorporated by reference. It is preferred to activate these films either by mechanical abrasion, e.g., sand blasting, by chemical treatment, e.g. oxidation with chromic acid, or by an irradiation procedure such as exposure to X-rays.

Suitable substrates for this invention include those which are opaque to the transmission of radiant energy. This prevents "printing-through" and also facilitates simultaneous or sequential formation of images and circuits on both major surfaces of the board. The bases can be rendered opaque to light energy mechanically, i.e., by frosting with sandblasting and the like, or chemically by etching with appropriate reagents, such as chromic acid for resins and hydrogen fluoride for glass, alkali for procelain, and the like. Frosted surfaces will scatter rather than adsorb incident energy. On the other hand, energy absorbing substances can be dispersed in the base or absorbed on the surface thereof to render the base opaque. By way of illustration, pigments, such as carbon black and titanium dioxide are useful to prevent penetration by light in the visible wavelengths, see, e.g., U.S. Pat. No. 2,888,954; bismuth, tin, lead and thorium compounds, as well as organic iodine compounds are useful as X-ray radiation and electron beam barriers, see, U.K. 686,445; U.K. 517,382; U.S. Pat. No. 3,361,700; U.S. Pat. No. 3,336,918; U.S. Pat. No. 2,857,915 and U.S. Pat. No. 2,403,704. Lead compounds are useful neutron shields. In selected embodiments, the base may be rendered opaque to light energy, particularly at visible or ultraviolet wavelengths with a conventional compound, such as a hydroxybenzophenone, a hydroxybenzotriazole or a substituted acrylate, and the like; see, for example, U.S. Ser. No. 155,616, filed June 22, 1971, now abandoned, the disclosure of which is incorporated herein by reference.

DETAILED DESCRIPTION OF THE DRAWING

Figure 1:
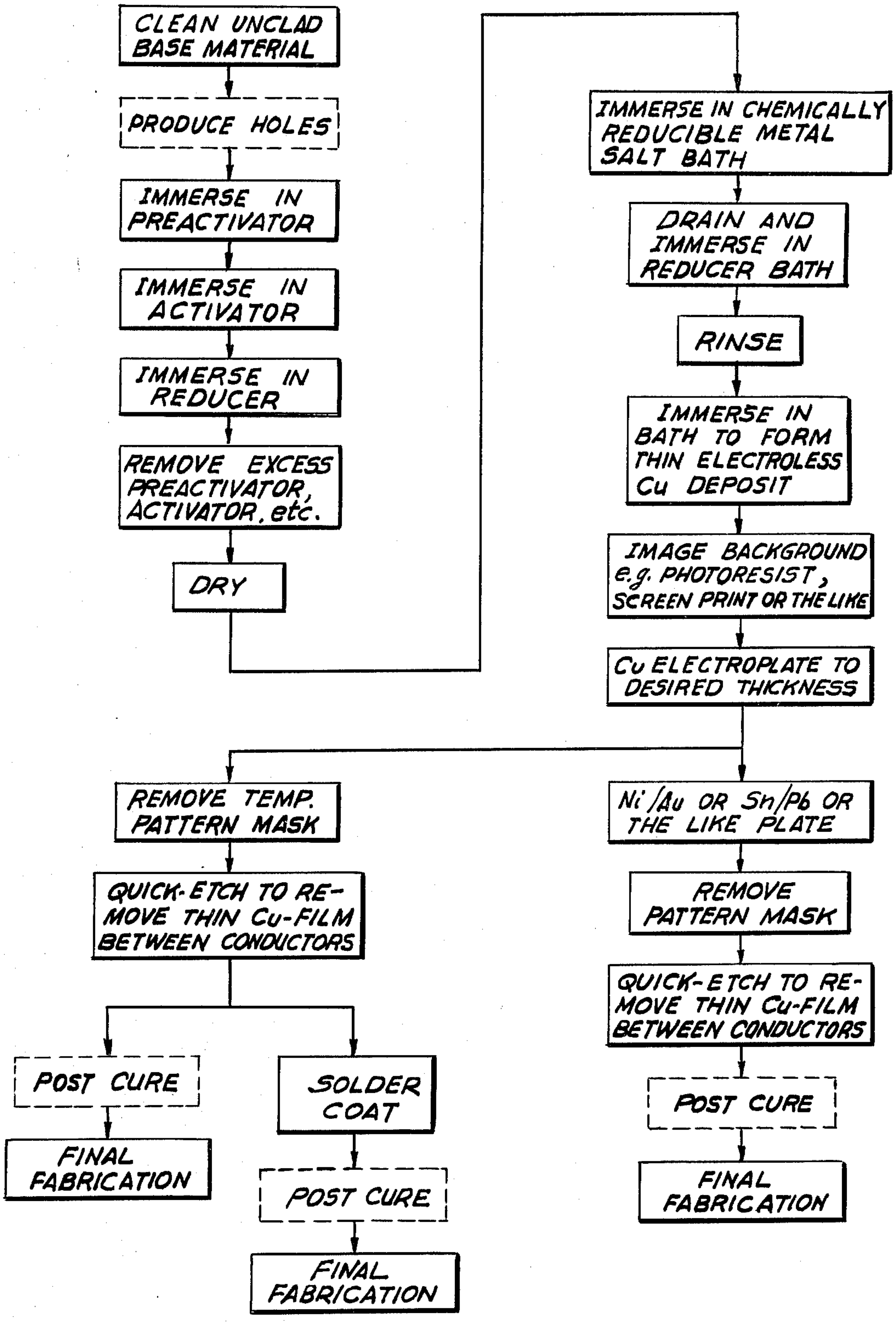
FIG. 1 is a flow diagram showing the steps employed in making a printed circuit using an adhesiveless direct bonding technique and a chemically reducible salt as a precursor for the catalytic nuclei which are formed prior to electroless plating.
Figure 5:
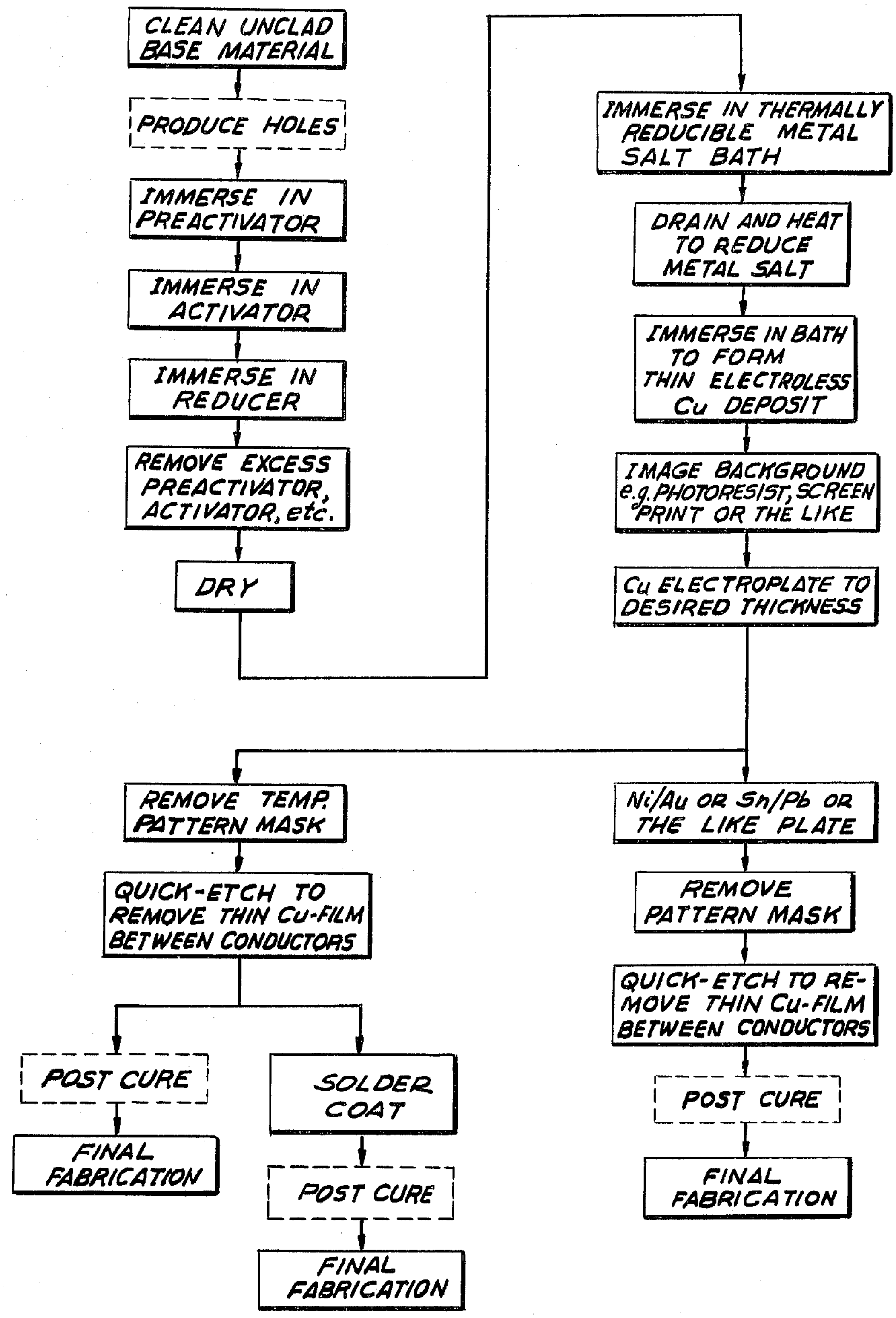
FIG. 5 is a flow diagram showing the steps employed in making a printed circuit using an adhesiveless direct bonding technique and a thermally reducible metal salt as a precursor for the catalytic nuclei which are formed prior to electroless plating.
Figure 6:
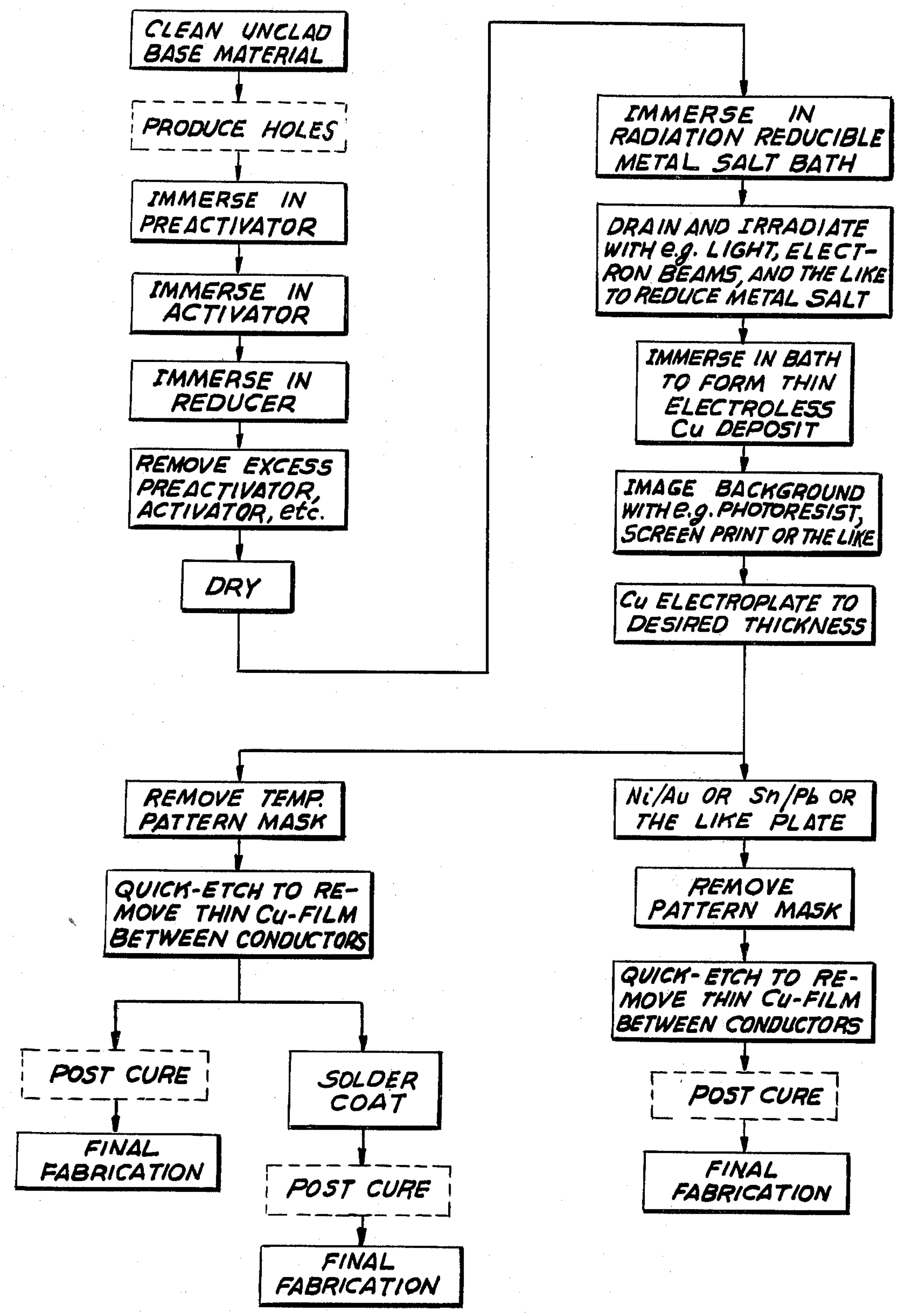
FIG. 6 is a flow diagram showing the steps employed in making a printed circuit using an adhesiveless direct bonding technique and a radiation reducible metal salt as a precursor for the catalytic nuclei which are formed prior to electroless plating.

The steps in making a printed circuit from an unclad laminate are shown in FIGS. 1, 5 and 6 wherein a chemically reducible, thermally reducible or radiation reducible metal salt is used to furnish catalytic nuclei for electroless metal deposition without any adhesive layer.

Figure 2:
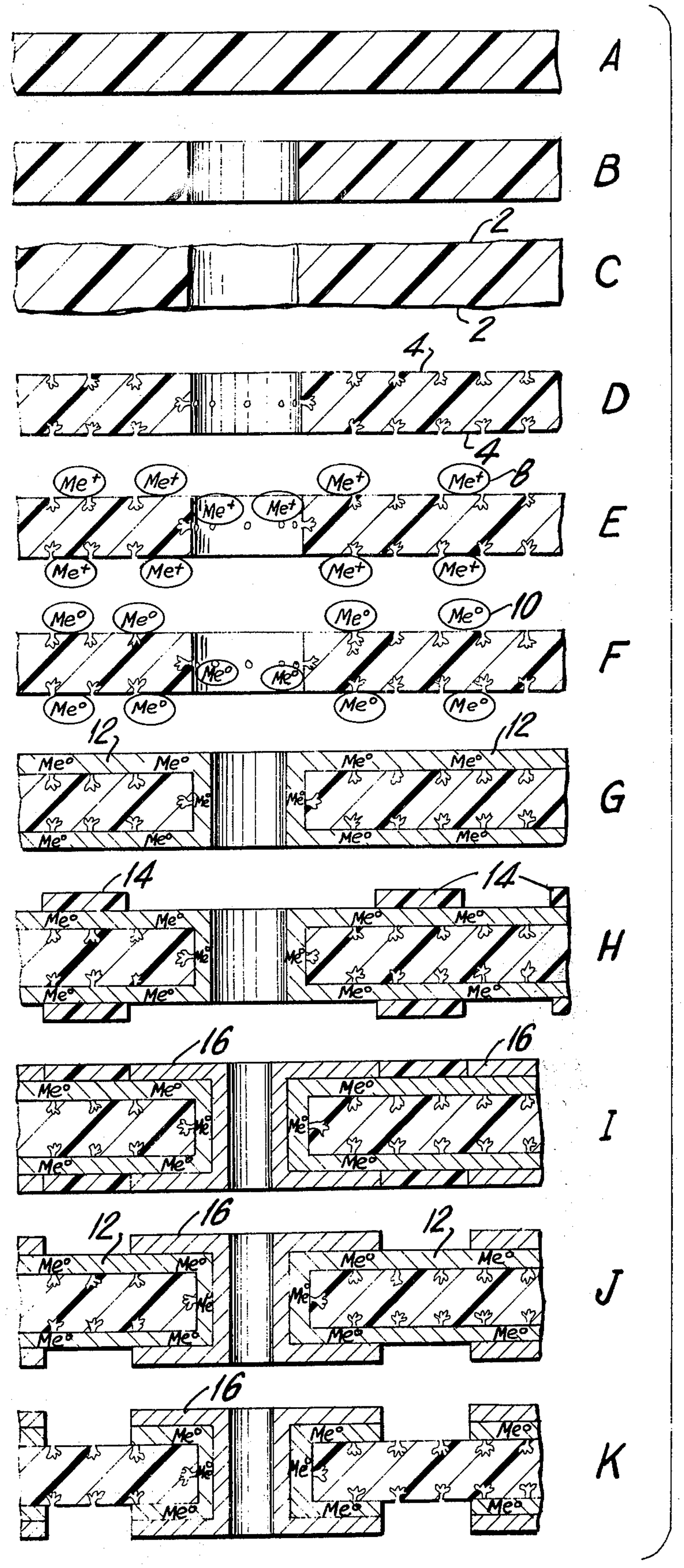
FIGS. 2, 3, and 4 are schematic illustrations showing a sequence of steps that may be employed in making two sided printed circuits with plated through holes. They are not drawn to scale.
Figure 3:
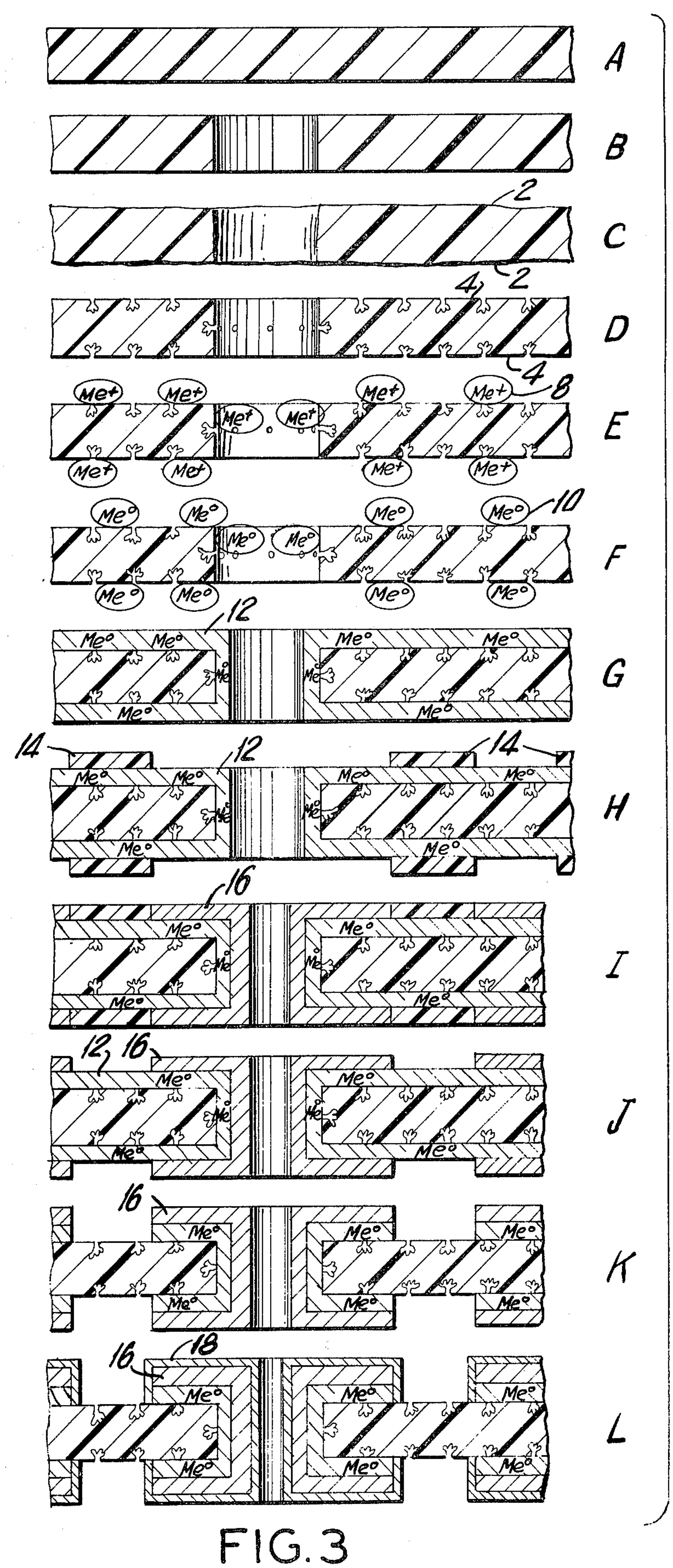
Figure 4:
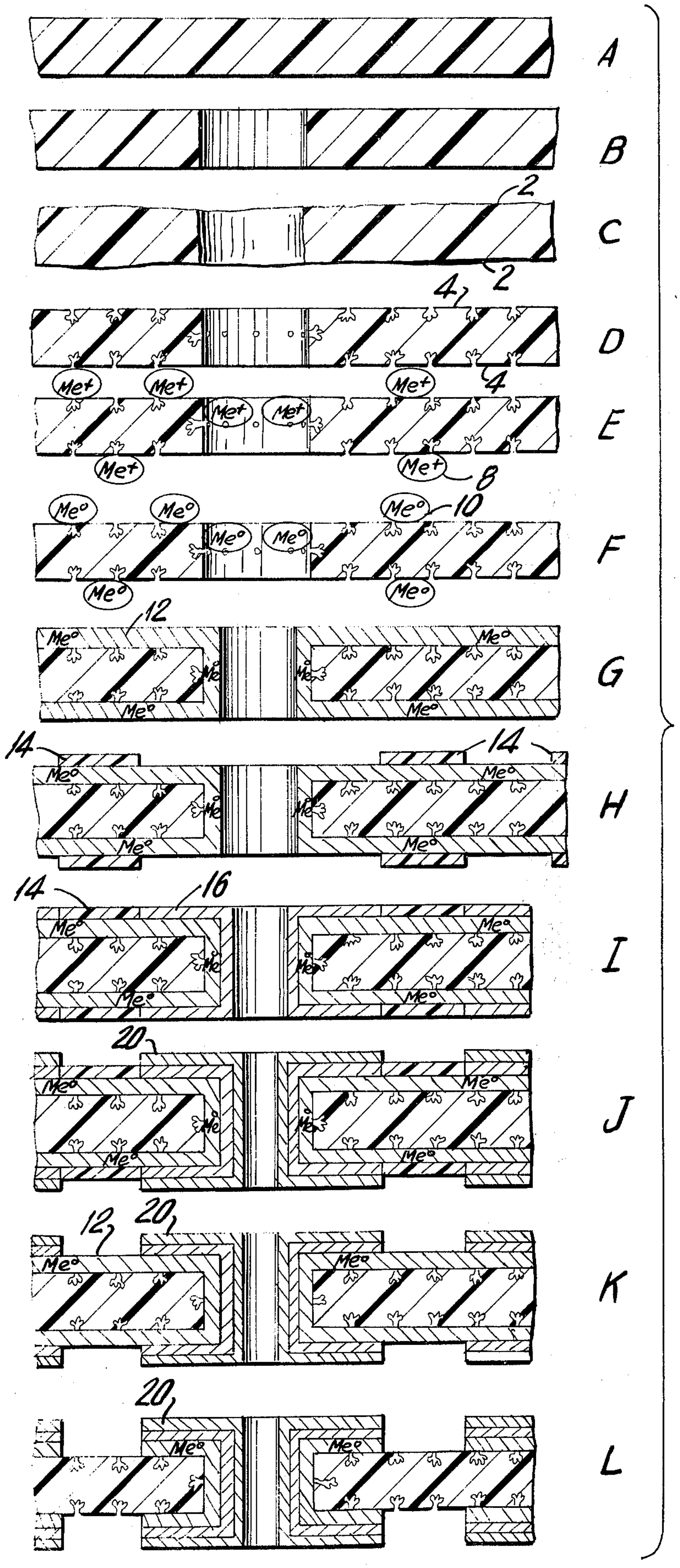

FIGS. 2, 3 and 4 show a schematic illustration of the step by step results achieved in the making of a printed circuit board.

FIG. 2A shows an unclad laminated circuit board in cross section. FIG. 2B in exaggerated form shows the laminated circuit board of FIG. 2A with a hole that has been drilled or punched through. FIG. 2C shows a preactivated board which has been temporarily polarized and rendered microporous and wettable according to the method disclosed herein. FIG. 2D pictorially shows the result 4 in an exaggerated not-to-scale drawing, of activation with an oxidizing agent to permanently polarize the surface and render it wettable.

FIG. 2E shows the steps whereby a layer 8 of a chemically, thermally or radiation reducible metal salt is applied to the surface to provide a precursor for the formation of catalytic nuclei. FIG. 2F illustrates the reduced metal salt which has been transformed to metallic 10 catalytic nuclei. The base is then placed in an electroless metal bath to build up a relatively thin layer 12 of electroless metal as shown in FIG. 2G.

FIG. 2H shows the imposition of a photoresist mask 14 which is applied to provide a relief image of the predetermined circuit configuration. FIG. 2I illustrates the subsequent deposition of a conductive layer of metal 16 which, according to the flow diagrams of FIGS. 1, 5 and 6 is electrolytically applied. FIG. 2J shows the base with the photoresist stripped off and the relatively thick layer of copper 16 and the relatively thin layer of electroless copper 12 between the conductors. The finished circuit board is shown at FIG. 2K after the thin layer of electroless copper of FIG. 2J has been removed.

FIG. 3 is identical to FIG. 2 insofar as views A-L are concerned. FIG. 3-L shows an additional view of a printed circuit board which has been dip solder coated 18 prior to final fabrication.

FIG. 4 is identical to FIG. 2 insofar as views A-I are concerned. FIG. 4J shows a view of a cross section of a printed circuit board which has been provided with a second metallic coating 20 such as a nickel/gold layer. FIG. 4K shows a view of the board after the photoresist mask has been stripped away. FIG. 4L shows the printed circuit board after the thin electroless copper layer 12 shown in FIG. 4-G has been etched away.

FIG. 5 shows a flow diagrams whereby an unclad base is adhesively made into a printed circuit using reducible metal salt as a precursor for the catalytic nuclei. The conductor patterns are electrolytically built up and may also have a second electroplated layer affixed.

FIG. 6 shows a flow diagram similar to FIG. 5 except that the catalytic nuclei are formed from a radiation reducible metal salt.

Figure 7:
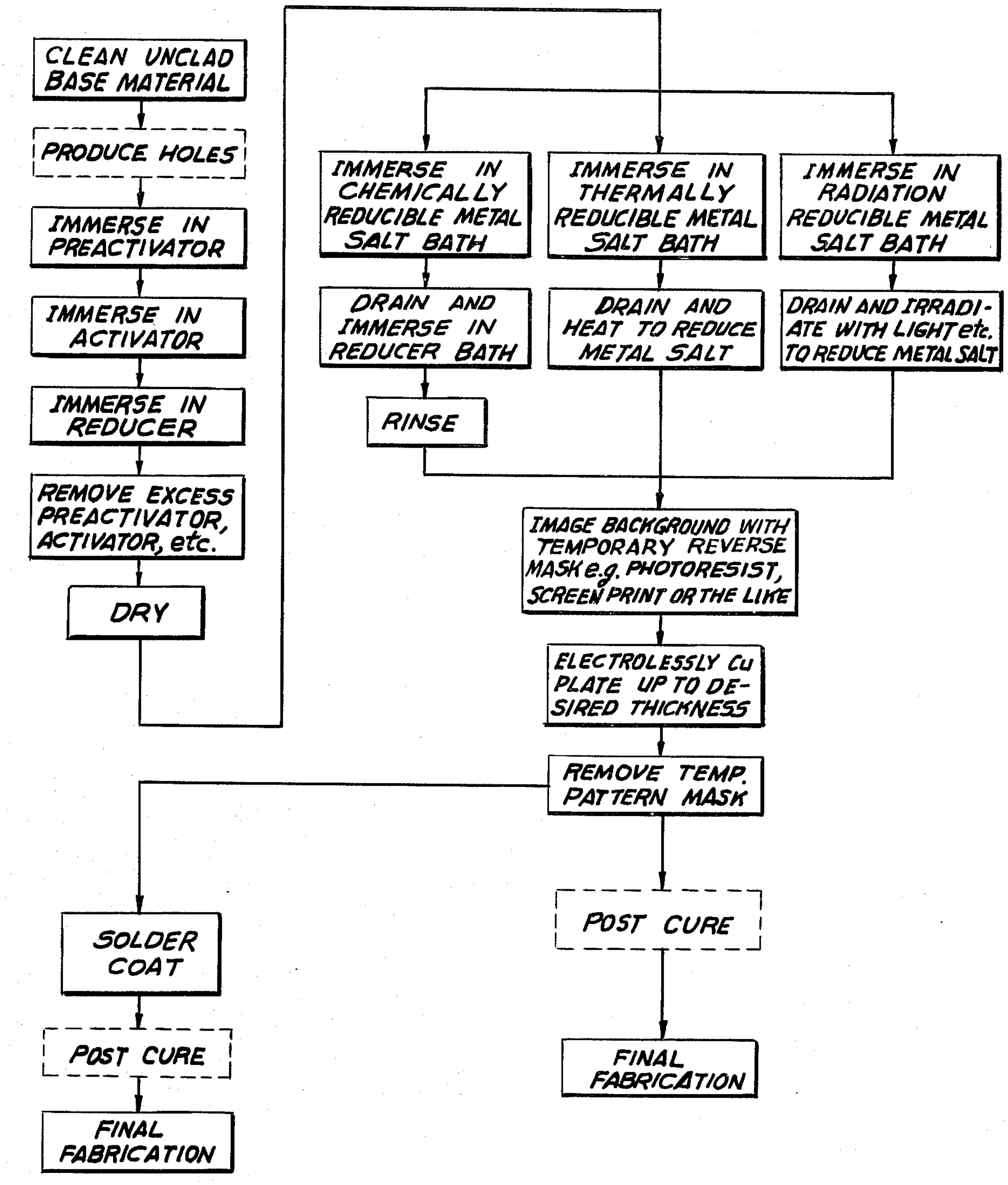
FIG. 7 is a flow diagram showing the steps employed in making a printed circuit using an adhesiveless direct bonding technique and a reducible agent to form the catalytic nuclei prior to a total electroless procedure for making the printed circuit pattern.

FIG. 7 shows a flow diagram whereby an unclad base is adhesivelessly made into a printed circuit board using a chemically, thermally or a radiantly reducible metal salt as a precursor for the catalytic nuclei and the conductor patterns are applied by an electroless method.

Figure 8:
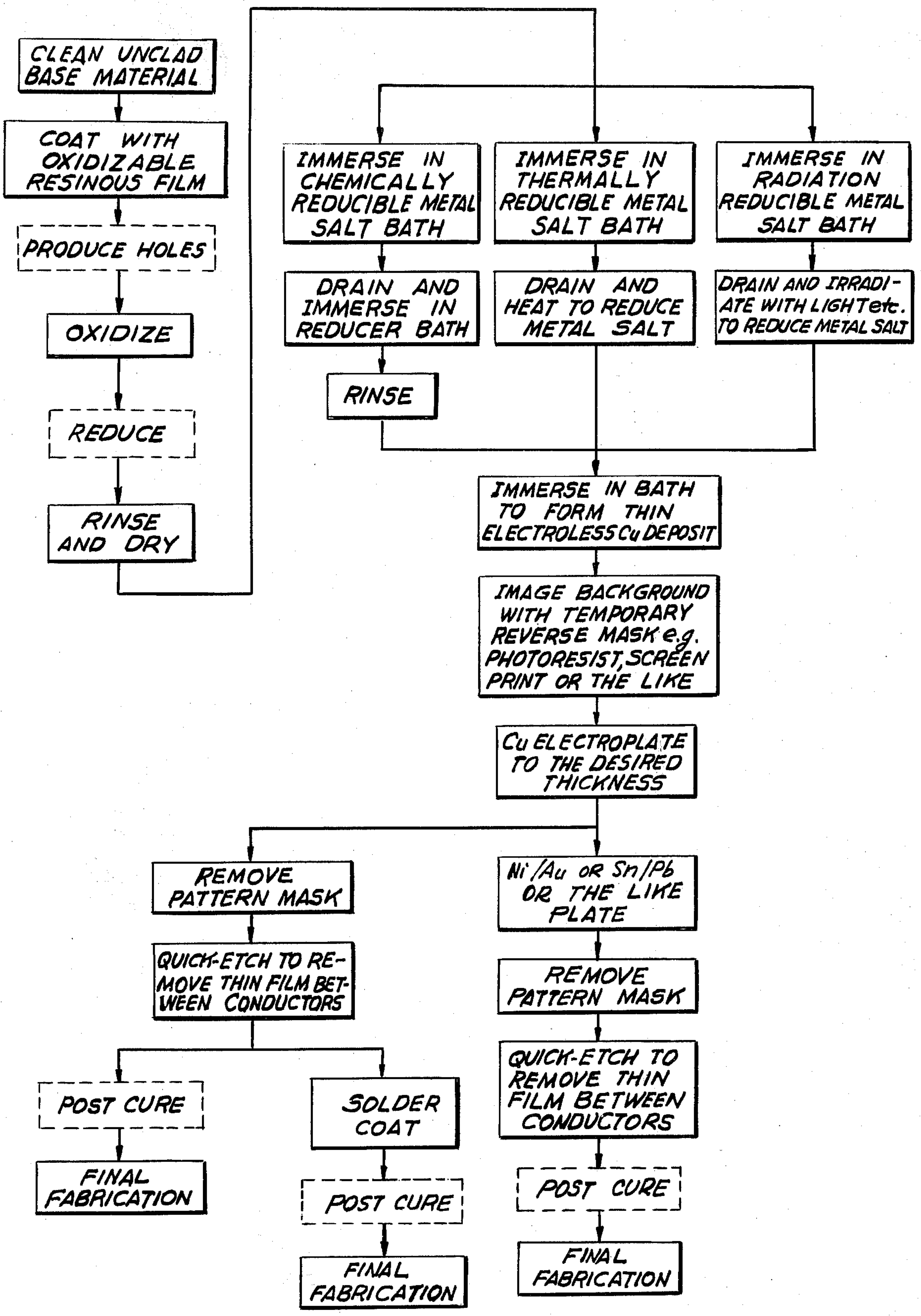
FIG. 8 is a flow diagram showing the steps employed in making a printed circuit using an adhesive bonding technique and a reducible agent to form catalytic nuclei prior to building up an electroplated circuit pattern on a then electrolessly deposited layer of copper.

FIG. 8 shows a flow diagram whereby an unclad base is adhesively made into a printed circuit board using a chemically, thermally or radiant reducible metal salt as a precursor for catalytic nuclei and the conductor patterns are electrolytically applied.

Figure 9:
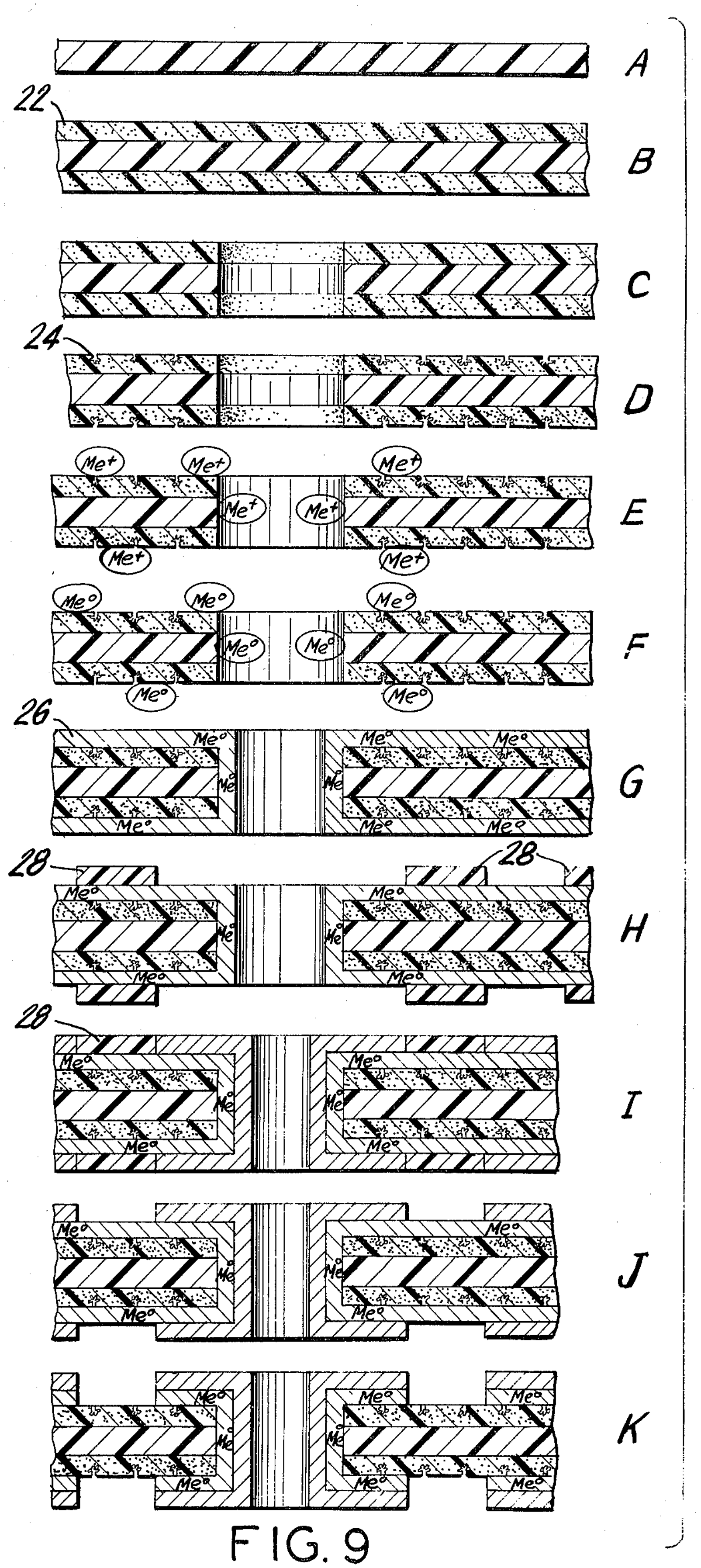
FIGS. 9, 10, and 11 are schematic illustrations showing a sequence of steps that may be employed in making a two-sided printed circuit having plated through holes. They are not drawn to scale.
Figure 10:
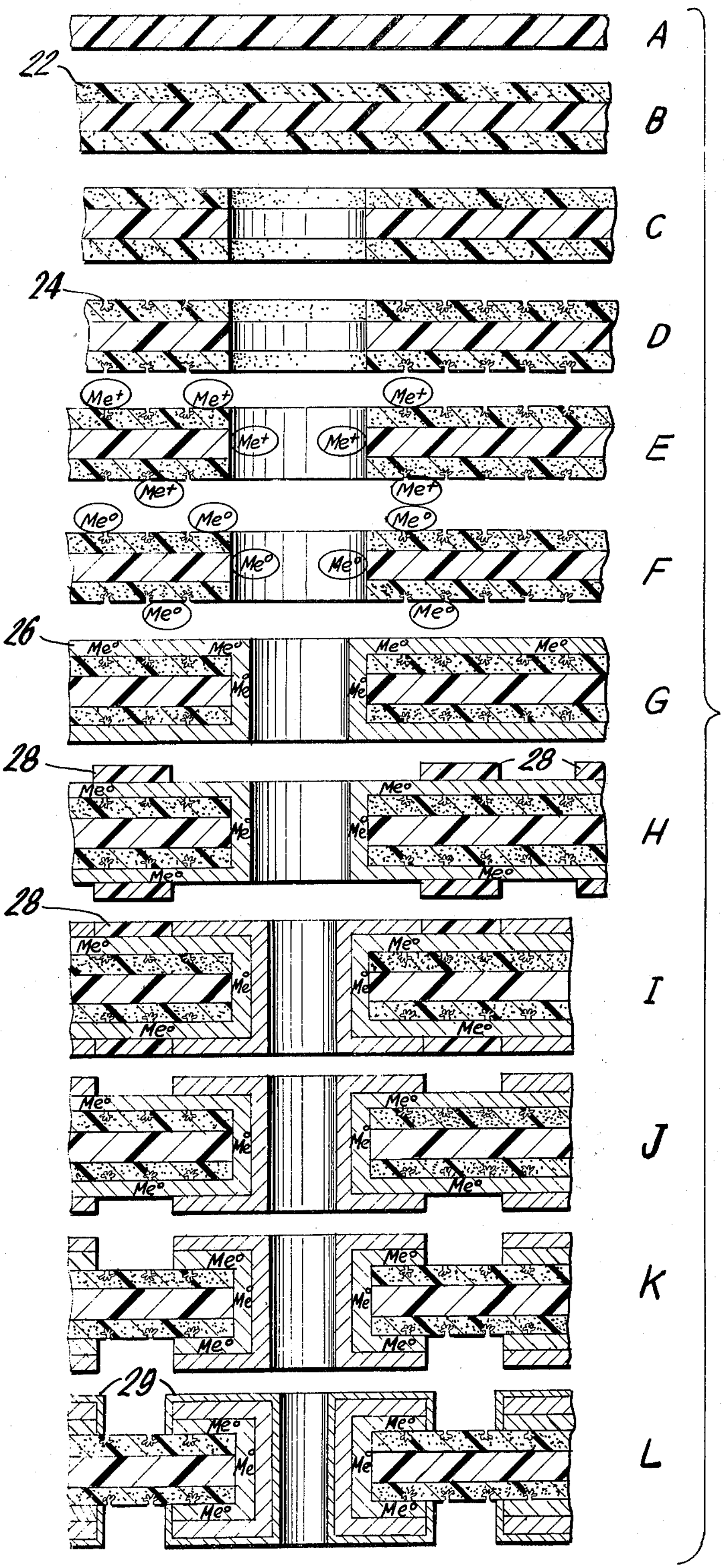
Figure 11:
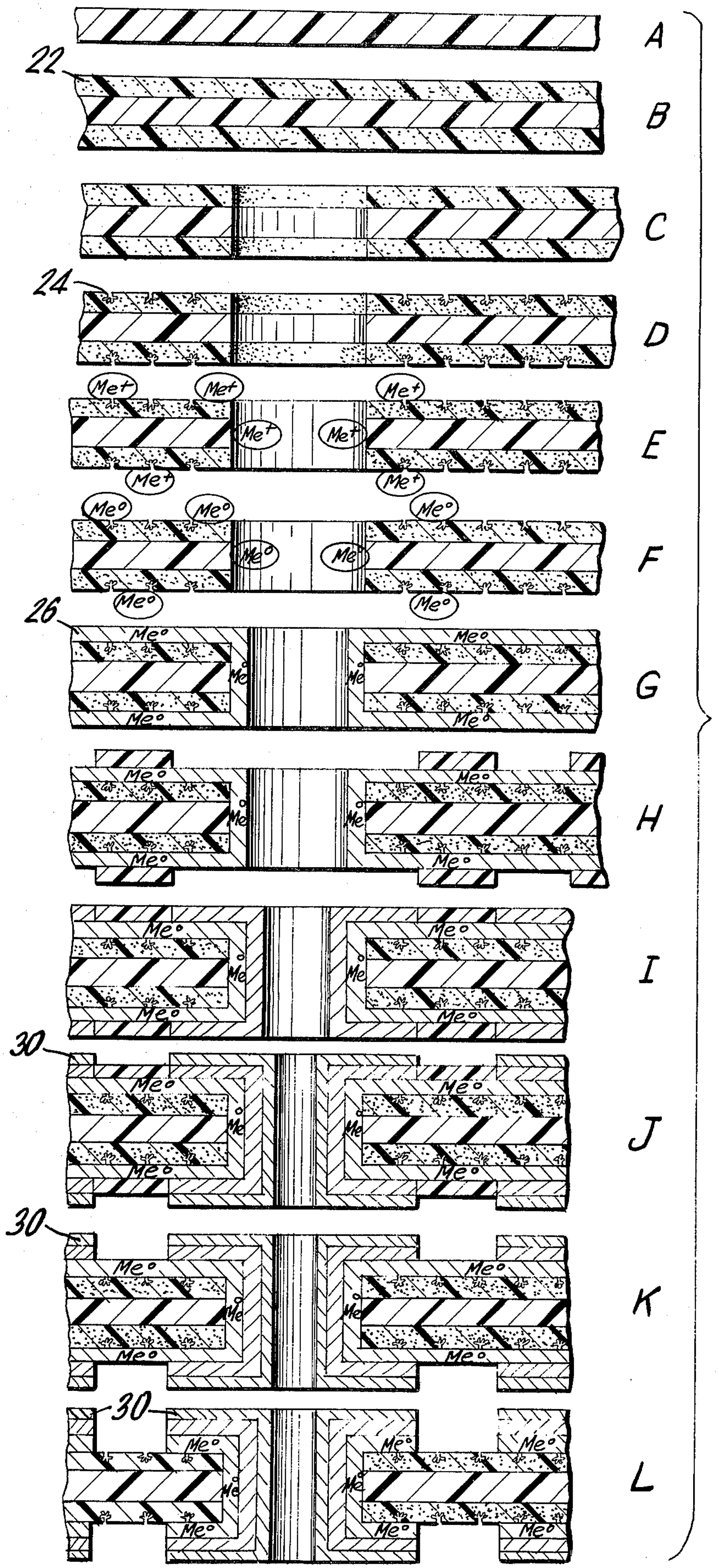

FIGS. 9, 10, and 11 show a schematic illustration of the step by step results achieved in the making of a printed circuit board.

FIG. 9-A shows a cross-sectional view of the unclad laminated base. The adhesive layer 22 is shown in FIG. 9-B. The optional step by which holes may be made is shown at FIG. 9-C. The oxidized microporous layer of adhesive 24 is shown in FIG. 9D. FIG. 9E shows the reducible metal salt ($Me^+$) which is applied as the precursor of the catalytic nuclei. They are shown in FIG. 9F as Me°. FIG. 9G represents the effect of applying a thin layer 26 of electroless metal to the base. FIG. 9H shows the masking pattern 28 in place to provide a background plating mask. FIG. 9I shows the step wherein the circuit pattern is built up to the desired thickness with conductive metal. FIG. 9J represents the printed circuit board with the plating mask stripped off. FIG. 9K shows the printed circuit with the thin layer of metal 26 etched from the board in the spaces between the built up conductive pathways to yield the finished board.

FIG. 10 shows the same cross-sectional view of FIG. 9 except for step L which represents the dip solder coating 20 of the base prior to post cure and final fabrication.

FIG. 11 shows the same cross-sectional view of FIG. 9 except that a second layer of metal 30 is applied to the base in step J prior to the removal of the plating mask as shown in FIG. 11K.

Figure 12:
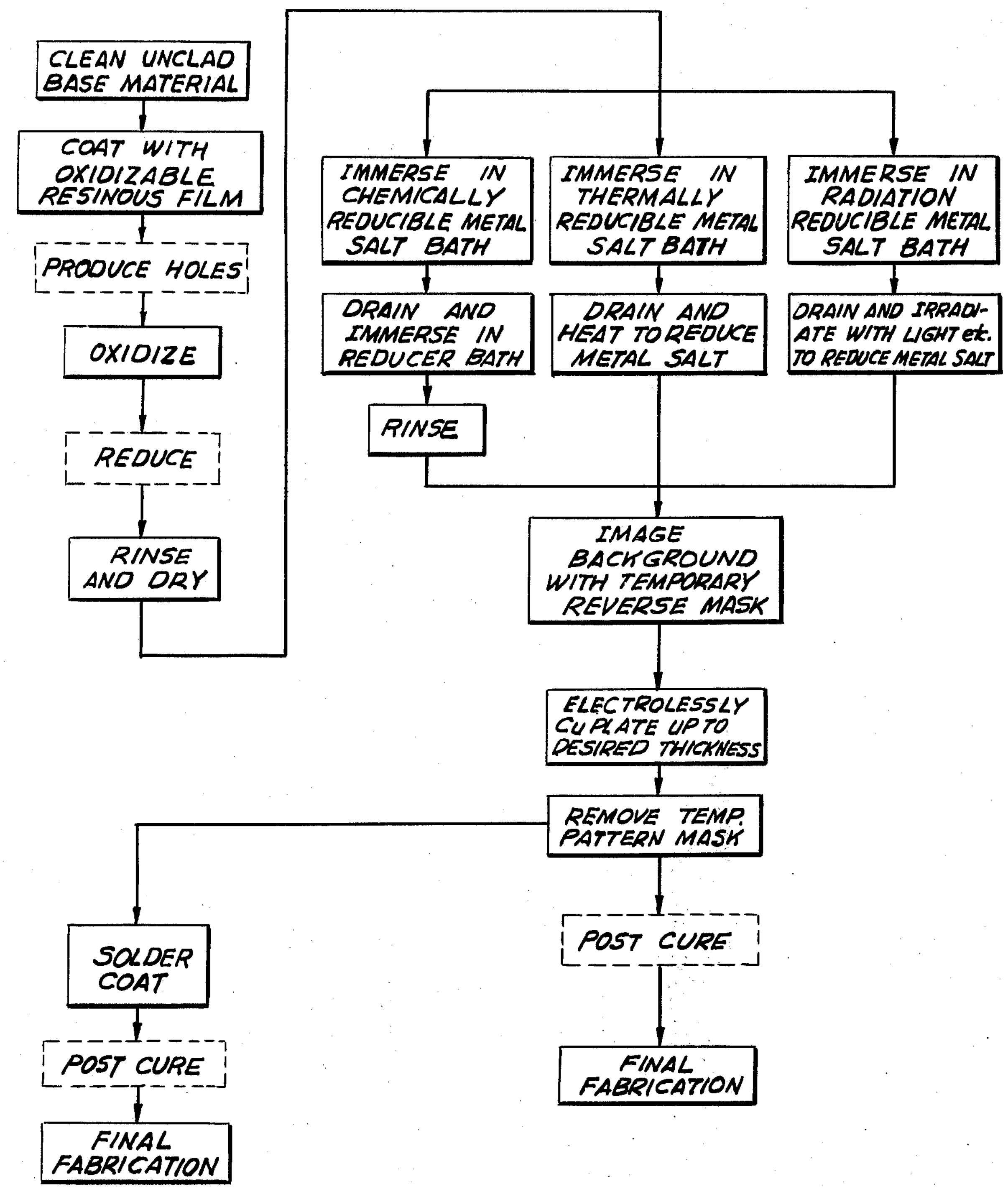
FIG. 12 is a flow diagram showing the steps employed in making a printed circuit using an adhesive bonding technique and a reducing agent to form catalytic nuclei prior to electrolessly producing the built-up printed circuit pattern.

FIG. 12 shows a flow diagram for making a printed circuit which employs an adhesive, and a radiant, chemical or thermal reduction means to produce catalytic nuclei. The conductive pattern is built up by a total electroless method.

Figure 13:
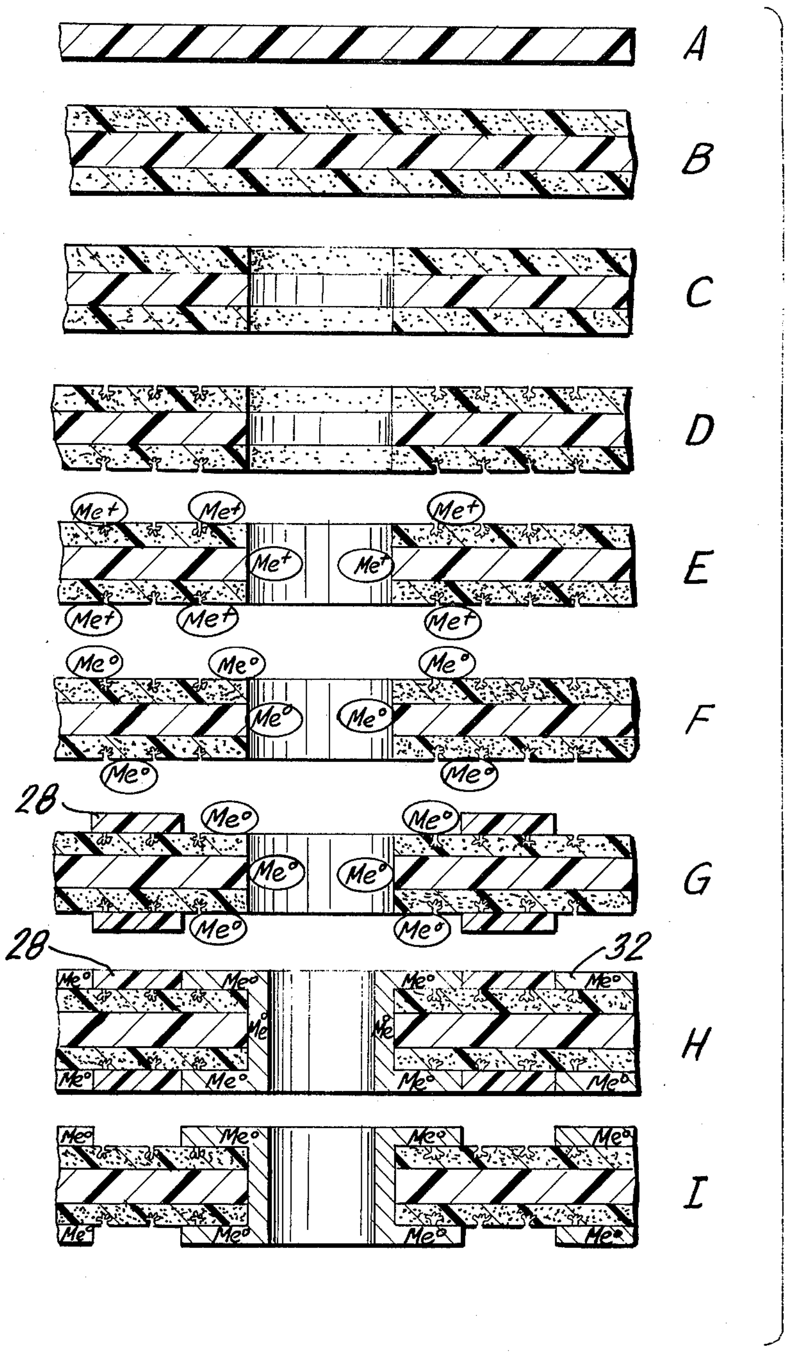
FIGS. 13 and 14 are schematic diagrams showing a sequence of steps that may be employed making two sided printed circuit boards having plated through holes. They are not drawn to scale.

FIG. 13 is a cross-sectional view of a printed circuit board according to the invention which in views A–F is the same as FIG. 9 A-F. The cross section shown in FIG. 13G shows the plating resist in place directly on the layer of catalytic nuclei. The conductive layer of metal 32 is applied by an electroless bath up to the desired thickness in FIG. 13H. Subsequently, in FIG. 13I the resist mask 28 is stripped off.

Figure 14:
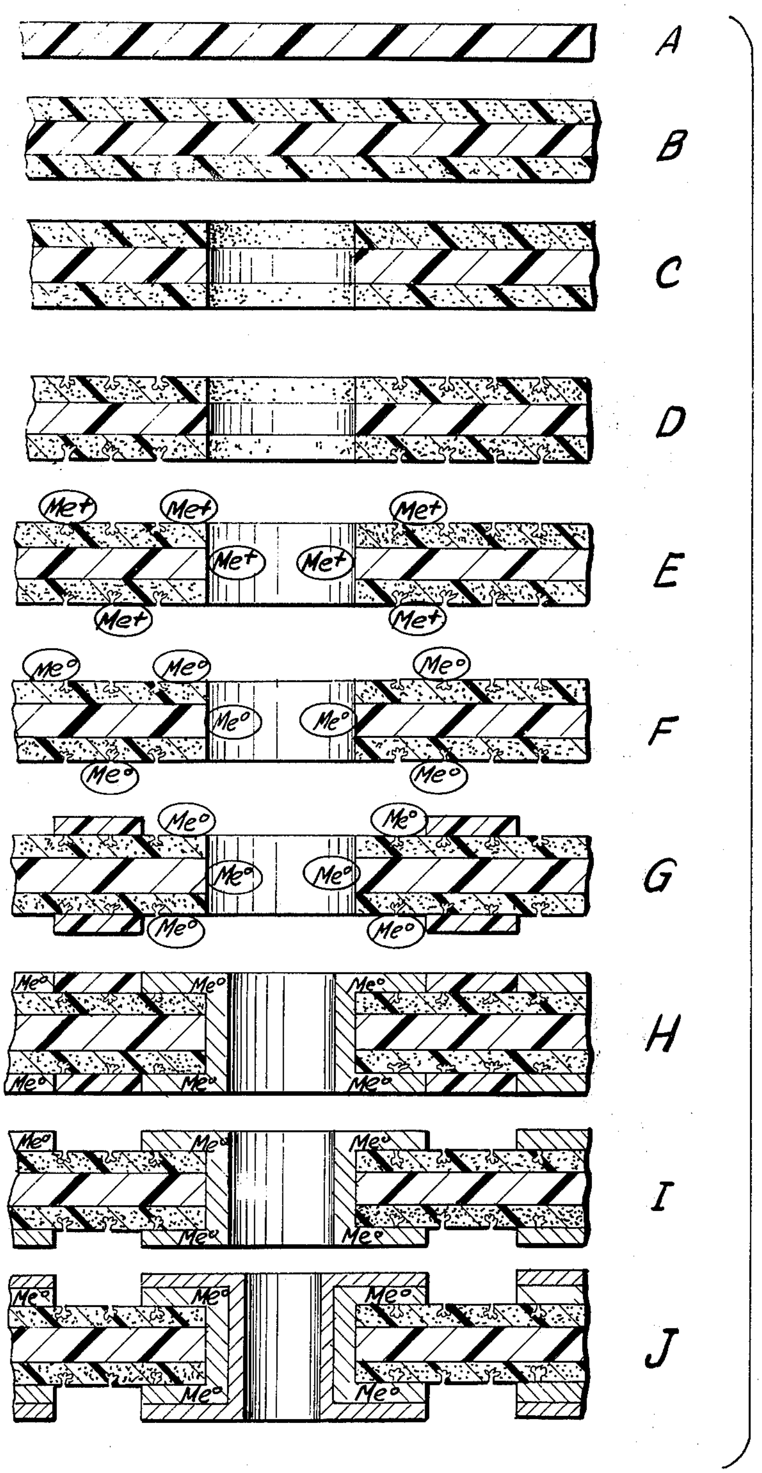

FIG. 14 is the same as FIG. 13 in steps A–I. The dip solder layer is shown in FIG. 14J.

Figure 15:
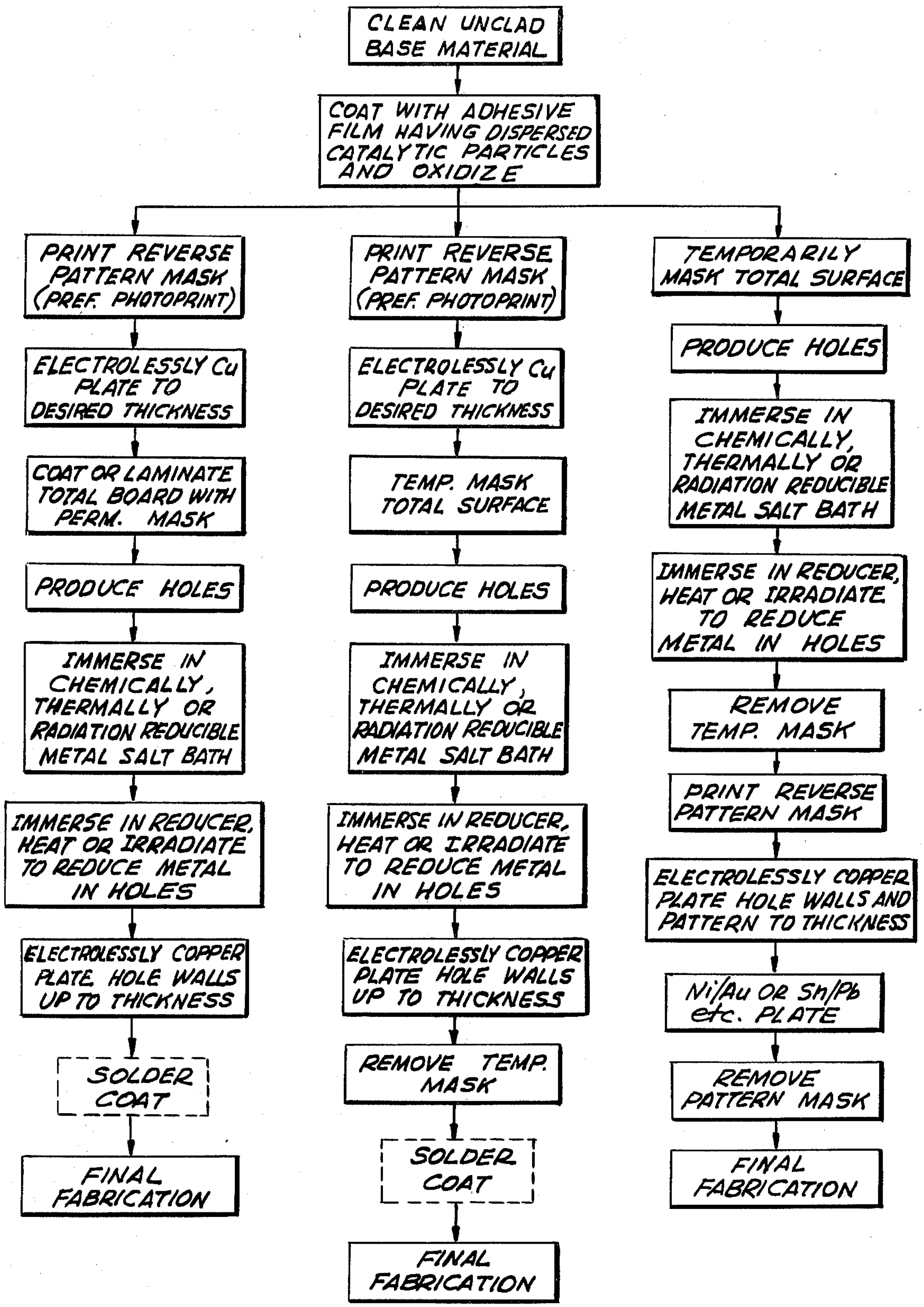
FIG. 15 is a flow diagram which shows the making of printed circuits with plated through holes.

FIG. 15 is a flow diagram which shows the use of the process of the invention in making plated through holes.

Figure 16:
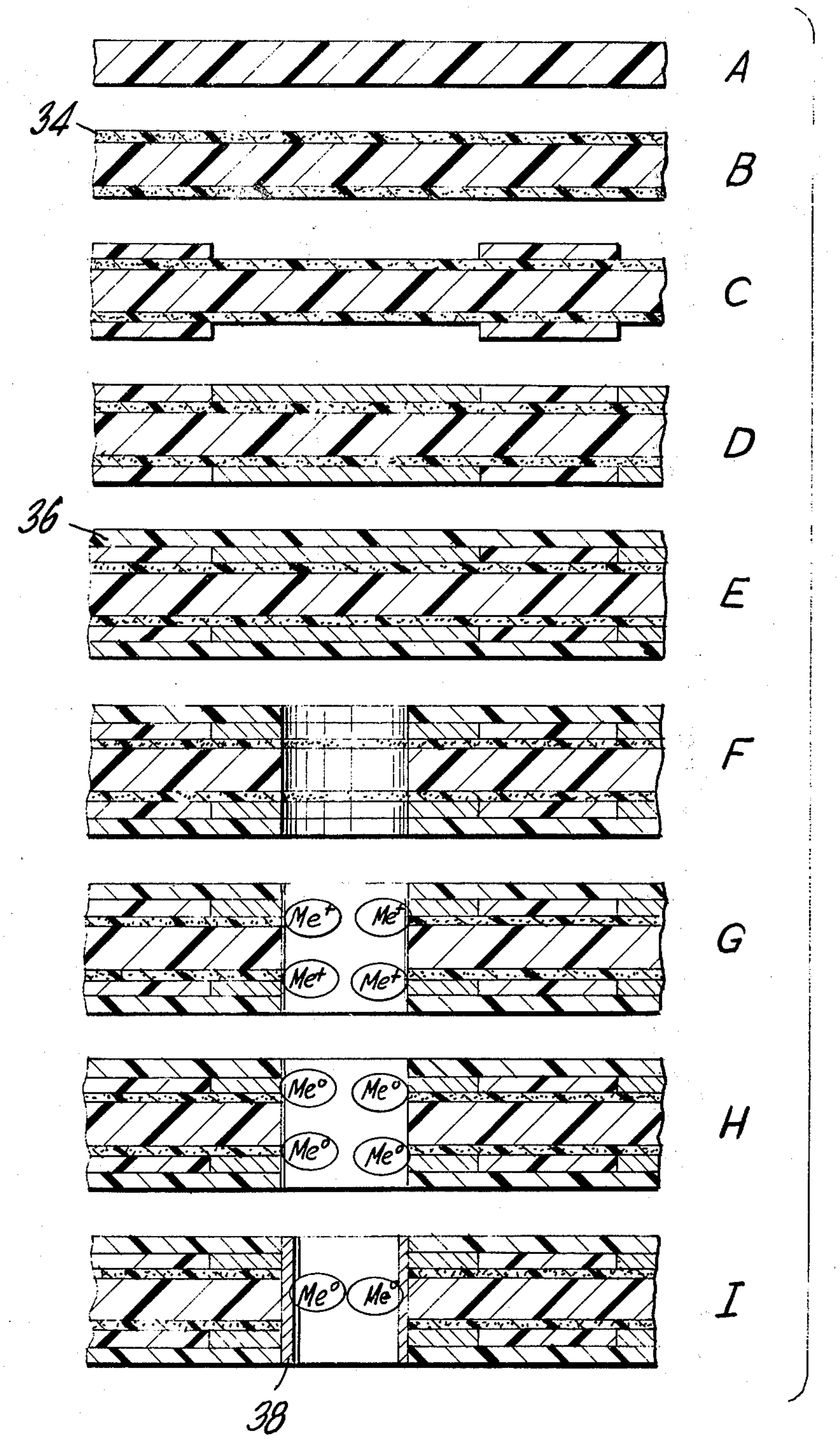
FIGS. 16, 17 and 18 are schematic illustrations showing a sequence of steps that may be used in making two-sided printed circuit boards having plating through holes.

FIG. 16 is a cross-sectional view of a board which is first provided with a conductive circuit pattern and then provided with holes which are plated by using a chemically, thermally or radiant reducible metal salt as a precursor for catalytic nuclei. FIG. 16B shows an oxidized catalytic adhesive film on the base. Thereafter, a background mask is placed on the base (FIG. 16C) and the circuit pattern is built up electrolessly as shown in FIG. 16D. A permanent mask may then be placed on the surface 36 as shown in FIG. 16E. Holes are then drilled or punched in the base (FIG. 16F). They are then metallized by using a salt and reduction means as described herein. The metal salt layer is shown in FIG. 16-G and the catalytic nuclei are shown in FIG. 16H.

The electrolessly applied layer of metal 38 on the hole wall is shown in FIG. 16-I.

Figure 17:
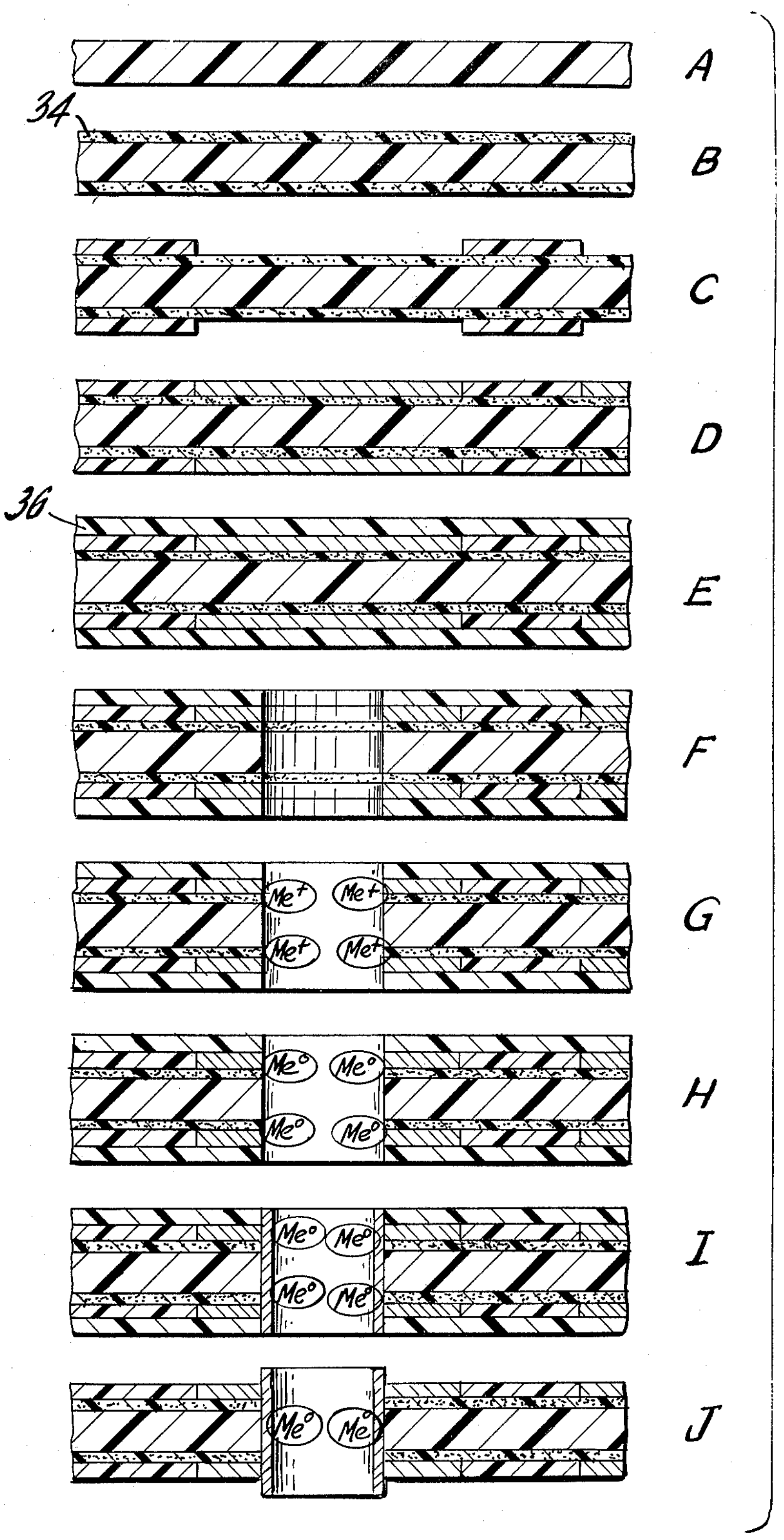

FIG. 17 is the same as FIG. 16 in steps A-D. FIG. 17-E shows a temporary mask in place. Thereafter, the step of FIG. 17 F-H are the same as those described above for FIG. 16F-I. The step of FIG. 17J represents the printed circuit board after removal of the temporary mask.

Figure 18:
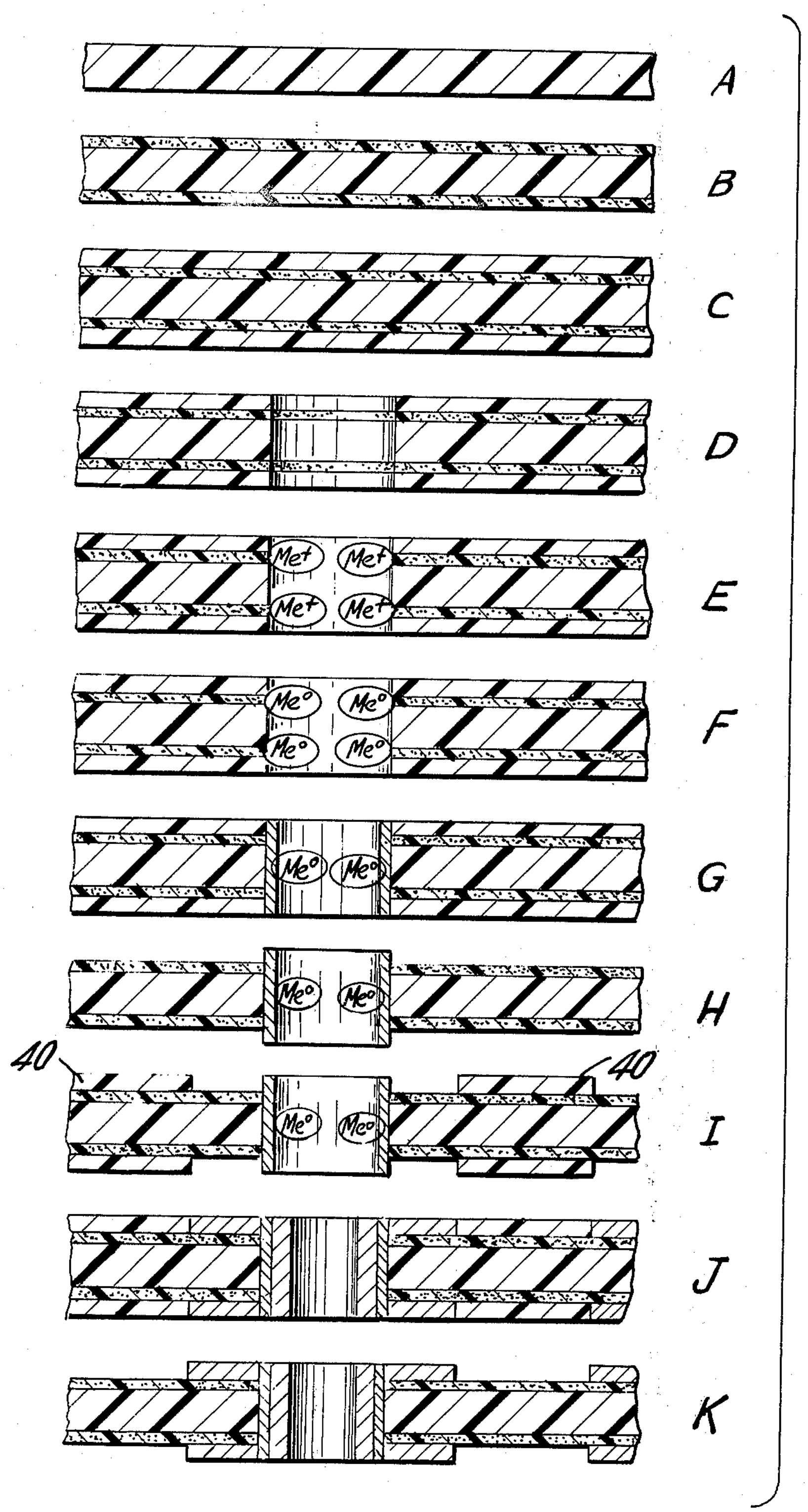

FIG. 18 is a cross sectional view of the steps involved in making a printed circuit board which are the same as FIG. 17 in steps A-B. FIG, 17C shows the placement of a temporary mask over the surface of the board with the adhesive layer. FIG. 18D shows the step wherein a hole is made in the masked board of FIG. 18C. The steps of FIG. 18E-H are the same as FIG. 17G-J. FIG. 18I shows the placement of a resist mask 40 on the base. FIG. 18-J shows the deposition of the metal layer on the unmasked areas of the insulating base which is subsequent to a sensitizing step (not shown). FIG. 18-K shows the printed circuit board with the mask 40 stripped off.

FIG. 19 shows the technique of metallizing hole walls of a copper clad base according to the invention.

FIG. 20 is a cross-sectional view showing the steps in making a printed circuit board from a thin copper clad base board. FIG. 20A shows the insulated base 42 with the thin copper layers 44 of metal laminated on both surfaces. FIG. 20B shows the step wherein the board is provided with a hole. FIG. 20 steps C–D show the formation of catalytic nuclei on the holes of the metal clad base member prior to the masking placement of FIG. 20E. The electroless deposition of metal to build up the conductive pathways and to plate the hole walls is shown in FIG. 20F. The mask is stripped as in FIG. 20G and the base etched as shown in FIG. 20H to remove the thin copper metal from between the conductive pathways.

Figure 21:
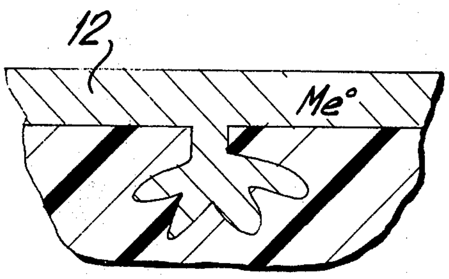

FIG. 21 is a grossly exaggerated cross-sectional view of the surface of a polarized insulating base which shows the smooth metallized surface 12 extending into a micropore in the surface.

The insulating base may also be provided with an oxidizable layer of an adhesive film which is oxidized prior to metallization. These adhesives are disclosed in U.S. Pat. No. 3,625,758, dated Dec. 7, 1971, which is incorporated by reference. Additional adhesives which are combined with materials catalytic to the reception of electroless metals are disclosed in U.S. Pat. No. 3,779,758 by Joseph Polichette which is hereby incorporated by reference.

In one procedure, after treatment with the polarizing agent, the insulating bodies are rinsed so as to eliminate any residual agent, following which they are immersed in a solution containing a wetting agent, the ions of which are base exchanged with the surface of the insulating base to thereby impart to the base relatively long chain ions which also are capable of chemically linking with precious metal ions or ionic complexes containing precious metal ions. Following treatment with the wetting agent, the insulating bodies are rinsed again so as to eliminate the residual wetting agent solution.

DESCRIPTION OF THE PREFERRED EMBODIMENTS

The following examples illustrate the methods and articles of this invention. They are not to be construed to limit the invention in any manner whatsoever.

EXAMPLE I

The process as illustrated this example produces a printed circuit on a base material with a normally nonpolar surface. The printed circuit has plated through holes, and the steps of this procedure are shown in stepwise by FIG. 5 and FIG. 2A-L.

An epoxy-glass laminated insulating board, 0.0600 inches thick is drilled or punched to provide holes at the desired location, cleaned by wet scrubbing with pumice, and dried.

The clean panel with holes (FIG. 2B) is preactivated by immersion in a 1:1 by volume mixture of dimethyl formamide and 1,1,1-trichloroethane at about 23°C for about 1 minute, then removed and allowed to drain and air dry. This results in a temporarily polarized, and wettable surface 2.

The preactivated panel (FIG. 2C) is then immersed in an oxidizer bath comprised of chromic acid, 100 g./l., sulfuric acid, 300 ml./l., balance water, for 5 minutes at about 45°C, drained for about 1 minute and then rinsed with water for about 1 minute. The activated permanently polarized, wettable base is then immersed in a reducer solution comprising 20 g. of potassium bisulfite, 1 ml. of sulfuric acid and water to make 1 liter, for about 5 minutes at about 23°C. Thereafter, the base is placed in a reducing solution to remove excess amounts of activator. The reducing step is shown by way of a film coating 6 in an exaggerated pictorial view in FIG. 2E.

Thereafter, layer 8 of reducible metal is placed on the base by immersion for 1–2 minutes in a solution of the following formulation:

| | |
|---|---|
| Cupric formate | 10 g. |
| Anthraquinone 2,6-disulfonic acid disodium salt | 2 g. |
| Water | 100 g. |
| Glycerine | 1 g. |

The coated substrate is placed in an oven for 10–20 minutes at 130°–140°C to reduce the layer of copper salt 8 to a layer of copper nuclei 10 (FIG. 3G).

The base is thereafter removed from the oven and allowed to cool. A thin electroless copper layer is deposited on the layer of copper nuclei on the catalytic substrate by immersing it in a bath at 55°C, the bath having the following composition:

| | | |
|---|---|---|
| Cupric sulfate | 0.03 | moles/l. |
| Sodium hydroxide | 0.125 | moles/l. |
| Sodium cyanide | 0.0004 | moles/l. |
| Formaldehyde | 0.08 | moles/l. |
| Tetrasodium ethylenediamine tetraacetate | 0.036 | moles/l. |
| Water | remainder | |

FIG. 2H shows the thin layer of electroless copper metal 12. After the thin layer of electroless copper is deposited, a photoresist layer 14 (FIG. 2I) is placed on the surface of the base in a predetermined configuration. Thereafter, an electrolytic layer of metal 16 (FIG. 2J) is applied to build up the conductive pattern to the desired thickness.

Subsequent to the electroplating step the photoresist material is removed with a solvent to yield a base with a built up conductor pattern 16 (FIG. 2K) and a thin layer of copper 12 on the areas of the base which has been masked with the photoresist (cf. FIG. 2I). Thereafter, the thin copper layer 12 of FIG. 2K is removed by etching the base in a standard ferric chloride etching solution to yield the printed circuit board of FIG. 2L.

EXAMPLE 2

The procedure of Example 1 is repeated as shown by FIG. 2 in sections A-L. An additional step is shown in FIG. 3M carried out to provide a layer of solder 18 over the circuit pattern. This is done by immersing the board in a molten bath of tin/lead solder and after removal, shaking the board to remove the excess solder.

EXAMPLE 3

The procedure of Example 1 is repeated as shown by FIG. 2 in sections A–J with the subsequent modified steps of K-M. FIG, 4K shows the step whereby the electrolytically built up circuit pattern is provided with a second electrolytic layer of metal 20 which may comprise nickel/gold or tin/lead. Thereafter, the photoresist 14 which was applied at FIG. 4I is removed by solvent stripping as shown at FIG. 4L. Thereafter, the base is etched with an ammonium peroxydisulfate solution to make the printed circuit board as shown at FIG. 4M.

EXAMPLE 4

A copper clad epoxy-glass laminate having holes drilled in it for through hole connection is cleaned with a hot alkaline cleaner of the type described above, and all loose particles are removed.

The clean laminate dip coated for 1–2 minutes in a solution of the following formulation:

| | |
|---|---|
| cupric formate | 10 g. |
| anthraquinone 2,6-disulfonic acid disodium salt | 2 g. |
| water | 100 g. |
| glycerine | 1 g. |

The coated substrate is placed in an oven for 10–20 minutes at 130°–140°C to reduce the layer of copper salt composition to a layer of copper nuclei.

The darkened substrate is removed from the oven and allowed to cool.

An electroless copper layer is deposited on the layer of copper nuclei on the catalytic substrate by immersing it in a bath at 55°C, the bath having the following composition:

| | | |
|---|---|---|
| cupric sulfate | 0.03 | moles/l. |
| sodium hydroxide | 0.125 | moles/l. |
| sodium cyanide | 0.0004 | moles/l. |
| formaldehyde | 0.08 | moles/l. |
| tetrasodium ethylenediamine tetraacetate | 0.036 | moles/l. |
| water | Remainder | |

The surface of the base and the walls of the holes in the base are covered with a firmly adherent layer of bright, ductile electrolessly deposited copper.

EXAMPLE 5

The procedure of Example 1 is repeated, substituting for the copper clad laminate base, an unclad epoxy impregnated glass fiber laminate (Westinghouse M-6528). The base is activated as follows:

a. Preactivate the surface of the base to temporarily polarized it by dipping in dimethyl formamide (DMF, sp. gr. 0.947–0.960 at 24°C) for 5 minutes, and drain for 15 seconds.

b. Solvent rinse the base in 9 parts by volume of ethyl acetate and 1 part by volume of DMF (sp. gr. 0.900 to 0.922 at 24°C) with occasional rack agitation to clear the holes for 30 seconds, and then drain for 15 seconds.

c. Repeat step (b) in a second solvent rinse tank, drain 15 seconds, then allow parts on rack load to air dry for 2 minutes.

c. Activate the base to permanently polarize it in a bath comprising:

| | | |
|---|---|---|
| $CrO_3$ | 80–100 | g./l. |
| Conc. $H_2SO_4$ | 200–250 | ml./l. |
| Fluorocarbon wetting agent (3-M Company, FC-95) | 0.5 | g./l. |

at 40°–45°C with gentle agitation of the solution for 5 minutes and drain for 15 seconds.

d. Reduce the base with potassium bisulfite solution for 1–2 minutes.

e. Rinse the polarized base for 5 minutes.

The activated base is sensitized and an electroless copper layer is deposited thereon by the procedure of Example 4.

EXAMPLES 6 and 7

The procedure of Example 4 is repeated, substituting an activated epoxy glass laminate as the base (Example 5) and metal salt baths of the following compositions:

EXAMPLE 6

| | | |
|---|---|---|
| cupric formate | 10 | g. |
| dimethyl formamide | 100 | ml. |
| anthraquinone 2,6-disulfonic acid disodium salt | 6 | g. |
| wetting agent (Rohm and Haas, Triton X-100) | 1 | g. |

EXAMPLE 7

| | | |
|---|---|---|
| cupric formate | 10 | g. |
| water | 100 | ml. |
| glycerine | 6 | g. |
| surface active agent (Triton X-100) | 1 | g. |

There are obtained electrolessly metallized bases according to this invention.

EXAMPLE 8

A clean epoxy-glass laminate polarized according to the procedure of Example 5 is dip coated for 1–5 minutes into a metal salt solution of the following formulation:

| | |
|---|---|
| cupric gluconate | 12.5 g. |
| surface active agent (Triton X-100) | 0.2 g. |
| glycerine (optional) | 70.0 g. |
| citric acid | 70.0 g. |
| water (to make) | 1 liter |

The substrate is allowed to dry thoroughly, heating if necessary, but not above 170°C.

The dry metallic compound coated substrate is immersed for 1–2 minutes into a reducing solution of the formulation:

| | |
|---|---|
| sodium borohydride | 10 g. |
| water (to make) | 1000 ml. |

The substrate, the surface of which has substantially darkened in color due to the deposition of a layer of metallic copper nuclei, is rinsed in running water for 3–5 minutes.

The sensitized substrate is then coated with a layer of electroless copper by immersing it into an electroless plating bath as described in Example 4.

EXAMPLES 9–17

The procedure of Example 8 is repeated, substituting for the cupric gluconate salt solution, the following:

(Example 9)

| | |
|---|---|
| cupric acetate | 4.0 g. |
| surface active agent (Triton X-100) | 0.8 g. |
| citric acid | 20.0 g. |
| glycerine (optional) | 40.0 g. |
| water (to make) | 500.0 ml. |

(Example 10)

| | |
|---|---|
| cupric acetate | 5 g. |
| ethyl acetate (to make) | 1 liter |

(Example 11)

| | |
|---|---|
| cupric chloride | 2.0 g. |
| methanol (to make) | 1 liter |

(Example 12)

| | |
|---|---|
| cupric acetate | 1.0 g. |
| ethyl acetate | 200 ml. |
| 1,1,1-trichloroethylene | 800 g. |

(Example 13)

| | |
|---|---|
| cupric acetate | 4.0 g. |
| surface active agent (Triton X-100) | 0.8 g. |
| water (to make) | 500 ml. |

(Example 14)

| | |
|---|---|
| nickelous chloride | 14 g. |
| water | 700 ml. |

(Example 15)

| | |
|---|---|
| cobaltous chloride | 14 g. |
| water | 700 ml. |

(Example 16)

| | |
|---|---|
| ferrous sulfate | 30 g. |
| water | 1000 ml. |
| sulfuric acid (to pH 2.0) | |

(Example 17)

| | |
|---|---|
| ferrous sulfate | 30 g. |
| methanol | 1000 ml. |

The metal salts on the dry, coated substrates are reduced to metallic nuclei with the sodium borohydride solution and an electroless copper layer is deposited thereon by the procedure of Example 4. It is to be noted that, in addition to copper metal nuclei, there are employed nickel (Example 14), cobalt (Example 15) and iron (Examples 16 and 17) nuclei.

EXAMPLES 18–20

The procedure of Example 8 is repeated, substituting the following reducing solutions for sodium borohydride in water:

(Example 18)

| | |
|---|---|
| sodium borohydride | 7.5 g. |
| water (to make) | 1000 ml. |
| sodium hydroxide (to pH 13) | |

(Example 18)-Continued (Example 19)

| | |
|---|---|
| sodium borohydride | 10 g. |
| dimethyl formamide | 1000 ml. |

(Example 20)

| | |
|---|---|
| dimethylamine borane | 20 g. |
| sodium hydroxide | 38 g. |
| water (to make) | 1000 ml. |

In all cases copper metallized substrates according to this invention are obtained.

Example 21

The procedure of Example 8 is repeated, substituting for the cupric gluconate solution, the following solution:

| | | |
|---|---|---|
| cupric acetate | 1.3 | g. |
| ferric ammonium sulfate | 3.5 | g. |
| pentaerythritol | 20 | g. |
| glycerol | 16 | g. |
| citric acid | 10 | g. |
| Sufactant 6G (Rohm & Haas Co.) | 0.3 | g. |
| water (to make) | 1000 | ml. |

A visible deposit of metallic nuclei is formed after a 2 minute exposure to the following solution:

| | |
|---|---|
| dimethylamine borane | 1 g. |
| sodium hydroxide | 37 g. |
| water (to make) | 1000 ml. |

Substrates metallized in accordance with this invention are obtained.

Example 22

A clean polarized epoxy-glass laminate (Example 5) is dip coated into a metal salt solution of the formula:

| | |
|---|---|
| cupric formate | 10 g. |
| anthraquinone 2,6-disulfonic acid disodium salt | 2 g. |
| water | 1000 ml. |
| glycerine | 10 g. |

and allowed to dry at 50°–60°c. for 5 minutes.

The substrate is exposed to u.v. light for about 1 to 2 minutes, forming a layer of copper nuclei. The substrate is heated for 3 to 5 minutes at 130° to 140°C. A layer of copper is built up in the nuclei by electrolessly depositing copper onto the substrate from a bath as described in Example 4.

EXAMPLES 23–26

The procedure of Example 22 is repeated (without heating) substituting the following reducible salt solutions:

(Example 23)

| | | |
|---|---|---|
| cupric formate | 10 | g. |
| anthraquinone 2,6-disulfonic acid disodium salt | 3 | g. |
| water | 450 | ml. |
| glycerine | 30 | ml. |
| citric acid | 30 | g. |
| stannous chloride | 1 | g. |
| fluorocarbon wetting agent (3-M Co., FC-170) | 0.25 | g. |

(Example 24)

| | |
|---|---|
| Prepare Part A: | |
| cupric gluconate | 15 g. |
| water | 200 g. |
| Prepare Part B: | |
| fluorocarbon wetting agent (FC-170) | 0.1 g. |
| glycerine | 30 g. |
| citric acid | 30 g. |
| anthraquinone 2,6-disulfonic acid disodium salt | 2 g. |
| stannous chloride | 1 g. |
| water | 250 g. |
| Mix A and B. | |

(Examples 25–26)

| | | |
|---|---|---|
| Prepare Part A: | | |
| cupric acetate | 15 g. | — |
| cupric nitrate | — | 15 g. |
| water | 200 g. | 200 g. |
| Prepare Part B: | | |
| wetting agent (FC-170) | 0.25 g. | 0.25 g. |
| glycerine | 30 g. | 30 g. |
| citric acid | 30 g. | 30 g. |
| anthraquinone 2,6-disulfonic acid disodium salt | 3 g. | 3 g. |
| water | 250 g. | 250 g. |
| stannous chloride | 1 g. | 1 g. |
| Mix A and B | | |

Examples 27–28

The procedure of Example 22 is repeated, substituting for the cupric formate solution, the following solution using ferric ammonium sulfate as the sensitizer:

(Example 27)

| | | |
|---|---|---|
| cupric acetate | 1.3 | g. |
| ferric ammonium sulfate | 3.5 | g. |
| pentaerythritol | 20 | g. |
| glycerol | 16 | g. |
| citric acid | 10 | g. |
| Surfactant 6G (Rohm & Hass Co.) | 0.3 | g. |
| water (to make) | 1000 | ml. |

A visible deposit of metallic nuclei is formed after a exposure to ultraviolet light. If desired, the deposit can be intensified by further contact with the following solution:

| | |
|---|---|
| dimethylamine borane | 1 g. |
| sodium hydroxide | 37 g. |
| water (to make) | 1000 ml. |

The procedure is repeated, substituting the following solution using L-ascorbic acid as the sensitizer:

(Example 28)

| | | |
|---|---|---|
| cupric acetate | 4 | g. |
| L-ascorbic acid | 5 | g. |
| pentaerythritol | 25 | g. |
| sorbitol | 30 | g. |
| citric acid | 20 | g. |
| stannous chloride | 0.5 | g. |
| Surfactant 6G (Rohm & Haas Co.) | 0.5 | g. |
| water (to make) | 1000 | ml. |

In all cases, substrates metallized according to this invention are obtained.

Instead of a resinous body, paper or a woven fabric can be used.

Flexible printed circuits are made by this method as follows:

a. treat a bibulous paper or flexible plastic film substrate with the metal salt solution;

b. dry for 5 to 10 minutes at 60°C.;

c. expose the dry coating through a negative to an ultraviolet light source;

d. develop or remove the unexposed metal salts under a warm water rinse;

e. immerse the treated paper or plastic film into an electroless copper solution and plate up to the desired thickness of metal;

f. neutralize the treated paper or film, wash and dry; and g. coat the treated paper or film with a polymerizable resin and polymerize the resin.

EXAMPLES 29–32

The procedure of Examples 1, 5 and 19 are repeated, substituting for the electroless copper solution, an electroless nickel solution:

(Example 29)

| | | |
|---|---|---|
| nickel chloride | 30 | g. |
| sodium hypophosphite | 10 | g. |
| glycollic acid | 25 | g. |
| sodium hydroxide | 12.5 | g. |
| water | 1000 | ml. |

The pH is adjusted to 4.5 and the bath temperature is maintained at 95°C. A nickel layer is built up on the copper nuclei.

The procedure of Examples 4, 8, and 22 are repeated substituting for the electroless copper solution, an electroless cobalt solution:

(Example 30)

| | |
|---|---|
| cobalt chloride | 30 g. |
| sodium hypophosphite | 20 g. |
| sodium citrate dihydrate | 29 g. |
| ammonium chloride | 50 g. |
| water (to make) | 1000 ml. |

The pH is adjusted to 9.5 and the bath temperature is maintained at 90°C. A cobalt layer is built up on the copper nuclei.

The procedure of Examples 4, 8, and 22 is repeated substituting for the electroless copper solution, an electroless gold solution:

(Example 31)

| | |
|---|---|
| gold chloride hydrochloride trihydrate | 0.01 mole/l. |
| sodium potassium tartrate | 0.014 mole/l. |
| dimethyl amine borane | 0.013 mole/l. |
| sodium cyanide | 0.4 mole/l. |
| water | q.s.a.d. |

The pH is adjusted to 13 and the bath temperature is maintained at 60°C. A gold layer is built up on the copper nuclei.

The procedure of Examples 4, 8, and 22 is repeated substituting for the electroless copper solution, an electroless silver solution:

(Example 32)

| | | |
|---|---|---|
| silver nitrate | 1.7 | g. |
| sodium potassium tartrate | 4 | g. |
| sodium cyanide | 1.8 | g. |
| dimethyl amine borane | 0.8 | g. |
| water (to make) | 1000 | ml. |

The pH is adjusted to 13 and the bath temperature is maintained at 80°C. A silver layer is built up on the copper nuclei.

The non-conductive layers of nickel, cobalt and iron nuclei prepared as described above can also be built up as described for the copper nuclei in these examples with electroless nickel, cobalt, gold and silver.

All such metallized substrates having a layer of electroless metal on top of the nuclei can further be built up with an electroplated layer of copper, silver, gold, nickel, cobalt, tin, rhodium and alloys thereof, using the baths and conditions described hereinabove.

The above disclosure demonstrates that the present process provides for the reduction of a layer of metal salt to a layer of metallic nuclei by means of radiant energy such as heat or light or by chemical reduction. The layer of nuclei has been shown to be catalytic to adherent electroless metal deposition and this metal can be further built up in thickness with electroplated metal.

The above teachings disclose means to use the instant invention in the preparation of printed circuit boards. Other methods specifically useful are as follows:

EXAMPLE 33

This procedure produces a printed circuit by photoprinting a negatively masked substrate coated with a reducible metal salt composition according to this invention and building up the conductive pattern electrolessly.

A resinous laminated base is polarized according to Example 5. Holes are provided in the base at preselected cross over points. The base is coated with a metal salt solution of the following formulation:

| | | |
|---|---|---|
| cupric formate | 10 | g. |
| anthraquinone 2,6-disulfonic acid disodium salt | 2 | g. |
| glycerine | 10 | g. |
| water (to make) | 1000 | ml. |

The base is allowed to dry at 50°–60°C. for 5 minutes.

The upper surface of the base is then covered with a negative mask of the desired surface pattern. The dry coating is exposed through the negative to an ultraviolet light source. Ultraviolet light is also directed down into the hole walls. The negative is removed and the unexposed metal salts are removed with a warm water rinse. The base is then exposed to an electroless copper solution (as described in Example 1), and electroless copper is deposited on the walls surrounding the holes and also on the areas of the upper metal film which were not exposed to ultraviolet light, thereby imposing a circuit pattern on the top surface of the base.

Next, if desired, if the circuit pattern is continuous, the base can be connected as an electrode in an electrolytic metal deposition solution to deposit additional metal on the walls surrounding the holes and also to build up the circuit pattern. In all other cases, techniques such as brush plating or the procedure disclosed, for example, in Polichette, U.S. Pat. No. 3,334,028, can be used for electroplating.

Alternatively, the circuit pattern can be produced by coating the base with the salt solution of Example 8 reducing with the sodium borohydride, applying a negative mask to define the circuit pattern, electrolessly building up the conductor pattern and the hole walls and finally stripping off the mask to produce the completed printed circuit.

EXAMPLE 34

This procedure produces a printed circuit by positive printing on the base.

A chemically clean laminate base is silk-screen printed with a circuit pattern, using the following composition as the "ink":

| | | |
|---|---|---|
| cupric formate | 10 | g |
| anthraquinone 2,6-disulfonic acid disodium salt | 2 | g. |
| glycerol | 10 | g. |
| water | 1000 | ml. |

The base is dried at 55°–60°C. for 5 minutes, then exposed to ultraviolet light for 2 minutes, forming a pattern of copper nuclei corresponding to the circuit pattern. The pattern is built up by electrolessly depositing copper onto the nuclei from a bath as described in Example 4.

EXAMPLE 35

The procedure of Example 34 is repeated, except that a thin electroless film only is deposited on the patterned nuclei. The base is then connected in an electrolytic copper deposition solution and the circuit pattern is built up electrolytically to the desired thickness. (See Example 33).

EXAMPLE 36

A resinous insulating base is provided with a uniform layer of an adhesive by dip coating in the following composition:

| | | |
|---|---|---|
| acrylonitrile-butadiene copolymer (Paracryl CV, manufactured by Naugatuck Chemical Div.) | 72 | g. |
| phenolic resin (SP-8014, manufactured by Schnectady Chemical Co.) | 14 | g. |
| methyl ethyl ketone | 1200 | g. |

The adhesively coated base is oxidized with chromic acid then dipped into a metal salt composition of the following formulation:

| | | |
|---|---|---|
| cupric formate | 10 | g. |
| anthraquinone 2,6-disulfonic acid disodium salt | 2 | g. |
| glycerol | 10 | g. |
| water | 1000 | ml. |

The base is dried at 55°–60°C. for 5 minutes, then exposed to ultraviolet light for 2 minutes, forming a layer of copper nuclei on the adhesive layer. The lower surface of the base is covered with a resinous mask and a negative image of the desired surface pattern is printed on the top surface of the base. The base is then exposed to an electroless copper solution (as described in Example 4), and electroless copper is deposited on the areas of the upper surface not covered by the mask, thereby imposing a circuit pattern on the top surface of the base.

Next, if desired, the base can be connected as an electrode in an electrolytic metal deposition solution to deposit additional metal to build up the circuit pattern.

When the pattern has been build up to the desired thickness, the base is treated with a solvent to strip off the mask. If desired, the copper nuclei previously covered by the mask can be stripped off with a quick etch to produce the completed printed circuit.

Substrates can include epoxy glass laminates, polyester film, ceramics, paper and the like. The polarization treatment described above provides a very active surface to which the metal salt strongly adsorbs and ultimately there is formed a strong bond between the base and the electrolessly deposited metal.

EXAMPLE 37

The procedure of Example 1 is repeated to polarize the surface of an epoxy glass laminated base. After polarization and rinsing etc., a chemically reducible metal salt, i.e., the bath of Example 8 is applied to the base by dip coating. It is dried and thereafter, the catalytic nuclei are formed by placing the base in the reducer bath of Example 8.

Thereafter, a thin layer of copper is applied to the surface of the base by immersion in an electroless copper bath as described hereinabove. The circuit pattern is then formed by placing a photoresist on the surface in a predetermined pattern. An electrolytic layer of copper is then applied to build up the conductive circuit pattern. The photoresist is removed by solvent stripping the thin copper metal from between the conductive pathways with a ferric chloride etching solution.

EXAMPLE 38

A clean polarized epoxy-glass laminate (Example 2) is dip coated into a metal salt solution of the formula:

| | |
|---|---|
| cupric formate | 10 g. |
| water | 100 ml. |
| glycerine | 6 g. |
| surface active agent (Triton X-100) | 1 g. |

The substrate is allowed to dry thoroughly, heating if necessary but not above 170°C. A steel die which is formed into a printed circuit pattern is heated to a temperature of 160°C and applied with even pressure to the surface of the base.

It is left in place for one minute and when it is removed an impression of catalytic nuclei remains in the areas which were in contact with the heated die. The circuit pattern is thereafter electrolessly metallized to form the conductive circuit pattern.

EXAMPLE 39

The procedure of Example 1 is repeated to polarize the surface of an epoxy-glass laminated base. After polarization and rinsing etc., a radiation reducible metal salt, solution, i.e., the composition of Example 22 is dip coated on the base. It is then exposed to an actinic light source as the reduction means to form catalytic nuclei. A thin layer of electroless copper is thereafter applied to the base. The background is imaged with Riston and the circuit pattern is built up with copper by an electrolytic bath. The mask is then removed with trichloroethylene and the base is quick etched with ferric chloride solution. A dip solder coat is applied and the printed circuit board is post cured in the oven at 300°F. Thereafter, it is final fabricated by the application of a varnish coating.

EXAMPLE 40

An insulating board of plating grade ABS is polarized and rinsed, etc. according to the method of Example 1 except that a 10 percent aqueous potassium permanganate solution is employed as the etchant. A chemically reducible metal salt solution, i.e., the bath of Example 8 is dip coated onto the base surface. As a reduction means, there is used a 15 percent formaldehyde solution to produce catalytic nuclei on the surface of the base. The background is then imaged with Riston and the circuit pattern is built up with electroless copper a thickness of 0.005 inches to provide the conductive pathways. The mask is removed with trichloroethylene and the mask is post cured prior to final fabrication.

EXAMPLE 41

The procedure of Example 39 is repeated to make a printed circuit board except that the insulating base is prepared from polyphenylene ether and a radiation reducible salt, i.e., the bath of Example 22 is employed to produce catalytic nuclei in conjunction with a carbon arc lamp as the reduction means.

EXAMPLE 42

The procedure of Example 39 is repeated to make a printed circuit board except that the insulating base is polystyrene and a thermally reducible metal salt, i.e., the composition of Example 12 is employed to produce catalytic nuclei in conjunction with a heated metal die having the configuration of a printed circuit as the reduction means.

EXAMPLE 43

A clean unclad epoxy-glass laminate is coated with a layer of an adhesive film which comprises butadiene-acrylonitrile rubber (i.e. Resin Mixture A-Example I of U.S. Pat. No. 3,625,758). It is then treated with a solution of chromic trioxide-sulfuric acid as in Example 5(*c*). Thereafter, it is rinsed with overflow water and oven dried at 180°F. It is dip coated (immersed) in the chemically reducible salt bath of Example 16 and catalytic nuclei are formed by the use of the solution of Example 18 as a reduction means. The background is imaged with a temporary reverse mask and a thin layer of electroless copper is applied. Then the circuit pattern is built up to the desired thickness with electrolytic copper and the mask is removed. The thin layer of copper between the conductors is then quick etched away prior to post curing and final fabrication.

EXAMPLE 44

The procedure of Example 43 is repeated except that a radiation reducible metal salt and a radiation reduction technique is employed.

EXAMPLE 45

The procedure of Example 43 is repeated except that a thermally reducible metal salt and a thermal reduction means is employed.

EXAMPLE 46

A clean unclad epoxy glass laminate is coated with an adhesive layer and oxidized and provided with catalytic nuclei as described in Example 43.

The circuit pattern is formed by a background mask and the conductive circuit pattern is built up to the desired thickness with electroless copper. The mask is removed and a dip solder coating is applied prior to post cure and final fabrication.

EXAMPLE 47

The procedure of Example 44 is repeated with the exception that the circuit pattern is built up by an electroless procedure.

EXAMPLE 48

The procedure of Example 46 is repeated except that the circuit pattern is further built up by an electrolytic procedure.

EXAMPLE 49

An acrylonitrile-butadiene-styrene base member, which is laminated with a thin layer of copper metal, is provided with holes in predetermined loci and immersed in the chemically reducible salt bath of Example 16. Catalytic nuclei are formed by the use of the solution of Example 18 as a reduction means. The circuit pattern is formed with a temporary reverse mask and the conductive pathways are built up to the desired thickness with electroless copper. The mask is removed and the base is quick etched prior to final fabrication.

EXAMPLE 50

A thin copper clad base is described in Example 49 is provided with a thermally reducible metal salt. The metal salt is reduced on the hole walls by contact with a hot circular metal rod which is rotated in the hole so that it contacts the reducible salt to form catalytic metal nuclei. Thereafter, the circuit pattern is formed in the manner described by Example 49.

EXAMPLE 51

The procedure of Example 49 is repeated except that a radiation reducible metal salt and a radiation reduction means is employed to produce a printed circuit board.

EXAMPLE 52

A clean epoxy glass laminate is coated with the adhesive of Example 43 and oxidized. A reverse circuit pattern mask is applied and the conductive pattern is built up to the desired thickness with electroless copper. A permanent mask is then applied to the board. Holes are produced in a predetermined loci by punches. Catalytic nuclei are produced by the chemical technique of Example 43. The hole is then electrolessly plated with copper up to the desired thickness with copper prior to final fabrication.

EXAMPLE 53

A printed circuit board is prepared as described in Example 52 except that a thermally reducible salt and a thermal reduction means is employed to form the catalytic nuclei.

EXAMPLE 54

A printed circuit board is prepared as described in Example 53 except that a radiation reducible salt and a radiation means of reduction is employed to form the catalytic nuclei.

The invention in its broader aspects is not limited by the specified steps, methods, compositions and improvements shown and described herein, and departures may be made within the scope of the accompanying claims without departing from the principles thereof.

We claim:

1. In a process for making printed circuit boards, a sensitization procedure wherein the steps consist essentially of applying a solution containing a reducible salt of a non-noble metal of the group consisting of metals of Period 4 of Groups IB and VIII of the Periodic Table of Elements directly to a surface of an insulating base and of reducing said salt by a technique of the group consisting of thermal reduction, reduction by radiation and reduction with chemical reducing agents to form a non-conductive layer of free metallic nuclei of said metal on said surface, said nuclei being catalytic for the deposition of electroless metal; and thereafter selectively metallizing the sensitized surface of said base.

2. A process as defined in claim 1 where said base has been pretreated to:

a. preactivate the surface by contacting said surface with an organic liquid which is capable of being imbibed by the surface to render the surface temporarily polar and wettable b. activate the surface by contacting said surface with an oxidizing agent to render it permanently polar and wettable c. reduce excess oxidizing agent with a reducing agent and d. rinse said surface.

3. A process as defined in claim 1 wherein the compound is reduced by chemical means.

4. A process as defined in claim 1 wherein the compound is reduced by thermal means.

5. A process as defined in claim 1 wherein the compound is reduced by radiation means.

6. A process as defined in claim 1 wherein the printed circuit pattern is formed by placing a photoresist background circuit mask on the surface, electrolessly depositing a metal on the exposed area and thereafter removing the photoresist background circuit mask.

7. A process as defined in claim 2 wherein an adhesive film having dispersed rubber particles is coated on the insulating base prior to pretreatment.

8. A process as defined in claim 1 wherein the insulating base is clad with a thin metal laminate and holes are formed prior to providing such base with non-conductive free metallic catalytic nuclei.

9. A process as defined in claim 1 wherein said base is opaque or has been rendered opaque to the transmission of radiant energy.

10. A process as defined on claim 1 wherein said solution is applied to preselected areas of said base.

11. A process as defined in claim 1 wherein said salt is a salt of an acid and a metal of the group consisting of copper, nickel, cobalt and iron.

12. A process as defined in claim 1 wherein said salt solution also contains an auxiliary reducing compound.

13. A process for making a printed circuit board which comprises:
a. treating a base material having a non-polar surface with a pre-activating compound or composition which consists essentially of an organic liquid capable of being imbibed by the surface to render the surface temporarily polar and wettable;
b. treating the pre-activated base material with an oxidizing agent;
c. treating the pre-activated, oxidized base material with a reducing agent;
d. treating the base to remove excess oxidizing and reducing agents;
e. drying the base or draining the base;
f. treating the base by a sensitization procedure wherein the steps consist essentially of applying a solution containing a reducible salt of a non-noble metal of the group consisting of metals of Period 4 of Groups IB and VIII of the Periodic Table of Elements directly to a surface of the base, of drying the base or draining the base, and of reducing said salt by a technique of the group consisting of thermal reduction, reduction by radiation and reduction with chemical reducing agents to form a non-conductive layer of free metallic nuclei of said metal on said surface, said nuclei being catalytic for the deposition of electroless metal;
g. rinsing the base;
h. forming a circuit pattern by placing a photoresist background mask on the surface;
i. electrolessly plating the circuit pattern with a metal up to the desired thickness;
j. removing the temporary pattern mask to produce the unmasked printed circuit board.

14. A process as defined in claim 13 including the step of producing at least one hole in the base before the preactivation step (a).

15. A process as defined in claim 13 including the subsequent step of solder coating to produce a printed circuit board having a layer of solder on the conductor lines.

16. A process as defined in claim 14 including the subsequent step of solder coating to produce a printed circuit board having a continuous layer of solder on the conductor lines and on the layer of metal in the hole walls in the printed circuit board.

17. A process for making a printed circuit board which comprises:
a. coating an insulated base with an oxidizable adhesive film;
b. treating the adhesive film with an oxidizing agent;
c. treating the surface with a reducing agent to remove excess oxidizing agent;
d. drying the base or draining the base;
e. treating the base by a sensitization procedure wherein the steps consist essentially of applying a solution containing a reducible salt of a non-noble metal of the group consisting of metals of Period 4 of Groups IB and VIII of the Periodic Table of Elements directly to a surface of the base, of drying the base or draining the base, and of reducing said salt by a technique of the group consisting of thermal reduction, reduction by radiation and reduction with chemical reducing agents to form a non-conductive layer of free metallic nuclei of said metal on said surface, said nuclei being catalytic for the deposition of electroless metal;
f. rinsing the base;
g. forming a circuit pattern by placing a photoresist background mask on the surface of the base;
h. electrolessly plating the circuit pattern with a metal up to the desired thickness; and
i. removing the temporary pattern mask to produce the unmasked printed circuit board.

18. A process as defined in claim 17 including the subsequent step of solder coating to produce a printed circuit board having a layer of solder on the conductor lines.

19. A process as defined in claim 17 including the step of producing at least one hole in the base before oxidizing step (b).

20. A process as defined in claim 19 including the additional step of solder coating to produce a printed circuit board having a continuous layer of solder on the conductor lines and on the layer of metal in the hole walls in the printed circuit board.

21. A process for making a printed circuit board which comprises:
a. producing holes in an insulating base which is covered with a thin layer of conductive metal;
b. treating exposed surfaces of said base by a sensitization procedure wherein the steps consist essentially of applying a solution containing a reducible salt of a non-noble metal of the group consisting of metals of Period 4 of Groups IB and VIII of the Periodic Table of Elements directly to the surface of the base and of reducing said salt by a technique of the group consisting of thermal reduction, reduction by radiation and reduction with chemical reducing agents to form a non-conductive layer of free metallic nuclei of said metal on said surface, said nuclei being catalytic for the deposition of electroless metal on the exposed surfaces of said base;
c. forming a circuit pattern by placing a photoresist background mask on the surface of the base;
d. electrolessly plating the circuit pattern with a metal up to the desired thickness;
e. removing the temporary pattern mask;
f. quick-etching the base to remove the thin metal layer between the conductors to produce the printed circuit board.

22. A process as defined by claim 21 which includes the subsequent step of solder coating to produce a printed circuit board having a layer of solder on the conductor lines.

23. A process for making a printed circuit board which comprises:
a. coating an insulating base with an adhesive film having dispersed therein a material which is catalytic to the reception of electroless metal and activating the film;
b. forming a circuit pattern by placing a photoresist background mask on the surface of the base;
c. electrolessly plating a metal on the exposed surface of the circuit pattern up to the desired thickness;
d. coating the circuit board with a permanent solder mask;
e. producing one or more holes through the base at a predetermined loci;
f. treating exposed surfaces of the base by a sensitization procedure wherein the steps consist essentially of applying a solution containing a reducible salt of a non-noble metal of the group consisting of metals of Period 4 of Groups IB and VIII of the Periodic Table of Elements directly to a surface of the base and of reducing said salt by a technique of the group consisting of thermal reduction, reduction by radiation and reduction with chemical reducing agents to form a non-conductive layer of free metallic nuclei of said metal on said surface, said nuclei being catalytic for the deposition of electroless metal on the surface of the walls of the holes;

g. rinsing the base; and h. electrolessly plating the walls of the holes with a metal up to the desired thickness to produce the printed circuit board.

24. A process as defined in claim 23 including the subsequent step of solder coating to produce a printed circuit board which has a permanent solder mask over the circuit pattern and a layer of solder in the walls of the plated through holes.

25. A process for making a printed circuit board which comprises:

a. coating an insulating base with an adhesive film having dispersed therein a material which is catalytic to the reception of electroless metal and activating the film;

b. forming circuit pattern by placing a photoresist background mask on the surface of the base;

c. electrolessly plating a metal on the exposed surface of the circuit pattern up to the desired thickness;

d. temporarily masking the total surface of the base;

e. producing one or more holes through the base at predetermined loci;

f. treating the masked base by a sensitization procedure wherein the steps consist essentially of applying a solution containing a reducible salt of a non-noble metal of the group consisting of metals of Period 4 of Groups IB and VIII of the Periodic Table of Elements directly to a surface of the base, of drying the base or draining the base, and of reducing said salt by a technique of the group consisting of thermal reduction, reduction by radiation and reduction with chemical reducing agents to form a non-conductive layer of free metallic nuclei of said metal on said surface, said nuclei being catalytic for the deposition of electroless metal on the surface of the walls of the holes;

g. rinsing the base;

h. electrolessly plating the walls of the holes with a metal up to the desired thickness; and i. removing the temporary mask to produce the printed circuit board.

26. A process as defined in claim 25 including the subsequent step of solder coating to produce a printed circuit board having a layer of solder over the conductor lines and on the walls of the plated through holes.

27. A process for making a printed circuit board which comprises:

a. coating an insulating base with an oxidizable adhesive film having dispersed therein a material which is catalytic to the reception of electroless metal and activating the film;

b. temporarily masking the total surface of the base;

c. producing one or more holes in the base at predetermined loci;

d. treating the masked base by a sensitization procedure wherein the steps consist essentially of applying a solution containing a reducible salt of a non-noble metal of the group consisting of metals of Period 4 of Groups IB and VIII of the Periodic Table of Elements directly to a surface of the base, of drying the base or draining the base, and of reducing said salt by a technique of the group consisting of thermal reduction, reduction by radiation and reduction with chemical reducing agents to form a non-conductive layer of free metallic nuclei of said metal on said surface, said nuclei being catalytic for the deposition of electroless metal on the surface of the walls of the holes;

e. rinsing the base;

f. removing the temporary mask;

g. forming a circuit pattern by placing a photoresist background mask on the surface of the base;

h. electrolessly plating the walls of the holes and pattern up to the desired thickness;

i. electrolessly plating the exposed circuit pattern with a second metal up to the desired thickness; and j. removing the pattern mask to produce the printed circuit board.

28. A process for making a printed circuit board which comprises:

a. pre-activating a normally non-polar insulating base by contacting the surface of said base with an organic liquid which is capable of being imbibed by the surface to render the surface temporarily polar and wettable;

b. activating the surface with an oxidizing agent to render it premanently polar and wettable;

c. reducing excess oxidizing agent with a reducing agent;

d. rinsing the surface;

e. drying the insulating base;

f. treating the base by a sensitization procedure wherein the steps consist essentially of applying a solution containing a reducible salt of a non-noble metal of the group consisting of metals of Period 4 of Groups IB and VIII of the Periodic Table of Elements directly to a surface of the base and of reducing said salt by a technique of the group consisting of thermal reduction, reduction by radiation and reduction with chemical reducing agents to form a non-conductive layer of free metallic nuclei of said metal on said surface, said nuclei being catalytic for the deposition of electroless metal;

a. rinsing the base;

h. electrolessly depositing a thin layer of metal on the surface of the base;

i. forming a circuit pattern by placing a photoresist background circuit mask on the surface;

j. electrolessly plating the exposed circuit pattern;

k. removing the photoresist background circuit mask; and l. quick-etching the base to remove the thin metal layer between the conductors to produce said printed circuit board.

29. In a process for making printed circuit boards, a sensitization procedure wherein the steps consist essentially of applying a solution containing a reducible copper salt directly to a surface of an insulating base and of reducing said salt with a chemical reducing agent to form a non-conductive layer of free copper nuclei on said surface, said nuclei being catalytic for the deposition of electroless metal; and thereafter selectively metallizing the sensitized surface of said base.

30. In a process for making printed circuit boards, a sensitization procedure wherein the steps consist essentially of applying a solution containing a reducible copper salt directly to a surface of an insulating base and reducing said salt by thermal reduction to form a non-conductive layer of free copper nuclei on said surface, said nuclei being catalytic for the deposition of electroless metal; and thereafter selectively metallizing the sensitized surface of said base.

31. In a process for making printed circuit boards, a sensitization procedure wherein the steps consist essentially of applying a solution containing a reducible copper salt directly to a surface of an insulating base and of reducing said salt by radiation to form a nonconductive layer of free copper nuclei on said surface, said nuclei being catalytic for the deposition of electroless metal; and thereafter selectively metallizing the sensitized surface of said base.

32. A process for making a printed circuit board which comprises:

a. preactivating a normally non-polar insulating base by contacting the surface of said base with an organic liquid which is capable of being imbibed by the surface to render the surface temporarily polar and wettable;
b. activating the surface with an oxidizing agent to render it permanently polar and wettable;
c. reducing excess oxidizing agent with a reducing agent;
d. rinsing the surface;
e. drying the insulating base;
f. immersing the base in a solution of a nonnoble metal salt compound selected from the metals of the group consisting of copper, nickel, cobalt, tin and iron which is chemically reducible to form a non-conductive deposit of freemetallic nuclei which are catalytic to the reception of electroless metal;
g. reducing said chemically reducible non-noble metal salt compound by thereafter treating the insulating base with a chemical reducing agent to form a layer of non-conducting metal nuclei and thereafter rinsing the base;
h. electrolessly depositing a thin layer of metal on the surface of the base;
i. forming a circuit pattern by placing a photoresist background circuit mask on the surface;
j. electrolessly plating the circuit pattern;
k. removing the photoresist background circuit mask; and
l. quick-etching the base to remove the thin metal layer between the conductors to produce said printed circuit board.

* * * * *

UNITED STATES PATENT AND TRADEMARK OFFICE

Certificate

Patent No. 3,907,621 Patented September 23, 1975

Joseph Polichette, Edward J. Leech and Francis J. Nuzzi

Application having been made by Joseph Polichette, Edward J. Leech and Francis J. Nuzzi, the inventors named in the patent above identified, and Photocircuits, a Division of Kollmorgen Corporation, Hartford, Connecticut, the assignee, for the issuance of a certificate under the provisions of Title 35, Section 256, of the United States Code, deleting the name of Francis J. Nuzzi as a joint inventor, and a showing and proof of facts satisfying the requirements of the said section having been submitted, it is this 4th day of May 1976, certified that the name of the said Francis J. Nuzzi is hereby deleted to the said patent as a joint inventor with the said Joseph Polichette and Edward J. Leech.

FRED W. SHERLING,
*Associate Solicitor.*